US012738229B2

(12) United States Patent
Lee

(10) Patent No.: US 12,738,229 B2
(45) Date of Patent: Sep. 15, 2026

(54) DISPLAY DEVICE AND AN ELECTRONIC DEVICE INCLUDING THE SAME

(71) Applicant: Samsung Display Co., LTD., Yongin-si (KR)

(72) Inventor: Gichang Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/934,395

(22) Filed: Nov. 1, 2024

(65) Prior Publication Data

US 2025/0148989 A1 May 8, 2025

(30) Foreign Application Priority Data

Nov. 7, 2023 (KR) ........................ 10-2023-0152491

(51) Int. Cl.
*G09G 3/3258* (2016.01)
*G09G 3/32* (2016.01)

(52) U.S. Cl.
CPC ............. *G09G 3/3258* (2013.01); *G09G 3/32* (2013.01); *G09G 2300/026* (2013.01); *G09G 2310/027* (2013.01); *G09G 2310/0286* (2013.01); *G09G 2320/0276* (2013.01); *G09G 2320/0673* (2013.01); *G09G 2330/028* (2013.01)

(58) Field of Classification Search
CPC ...... G09G 3/3685–3692; G09G 3/3275–3291; G09G 2310/0264–0297; G09G 2300/02–026; G09G 2300/0408; G09G 2300/0809–0838; G09G 2300/0871
See application file for complete search history.

(56) References Cited

U.S. PATENT DOCUMENTS 6,014,193 A * 1/2000 Taira .................. G02F 1/13336 349/110
2003/0090451 A1* 5/2003 Ahn .................... G09G 3/3688 345/96
2012/0127143 A1* 5/2012 Gondo ................ G09G 3/3648 345/208
2017/0287381 A1* 10/2017 Park .................... G02F 1/13454
2019/0347985 A1* 11/2019 Shaeffer ................ H05B 45/20
2022/0223573 A1* 7/2022 Yang .................... G09G 3/3208
(Continued)

FOREIGN PATENT DOCUMENTS

KR 101818384 B1 1/2018

*Primary Examiner* — Roberto W Flores
(74) *Attorney, Agent, or Firm* — CANTOR COLBURN LLP

(57) ABSTRACT

A display device includes: a substrate including a display area and a non-display area; a plurality of data drivers disposed in the display area on the substrate and each including a first latch disposed adjacent to one side of the display area facing the non-display area, a shift register spaced apart from the first latch in a first direction, and a second latch spaced apart from the shift register in the first direction; a plurality of pixels disposed between elements of the data drivers adjacent to each other, where the elements include the first latch, the shift register, and the second latch; and a plurality of first data lines disposed in the non-display area on the substrate, adjacent to the first latch, connected to the data drivers, and to which a data signal in a digital form is applied.

17 Claims, 16 Drawing Sheets

(56) References Cited

U.S. PATENT DOCUMENTS

| | | | | |
|---|---|---|---|---|
| 2023/0326394 | A1* | 10/2023 | Lou | G09G 3/32 |
| 2024/0169925 | A1* | 5/2024 | Yuan | G11C 19/287 |
| 2024/0215422 | A1* | 6/2024 | Yuan | G02F 1/1362 |

* cited by examiner

DISPLAY DEVICE AND AN ELECTRONIC DEVICE INCLUDING THE SAME

This application claims priority to Korean Patent Application No. 10-2023-0152491, filed on Nov. 7, 2023, and all the benefits accruing therefrom under 35 U.S.C. § 119, the content of which in its entirety is herein incorporated by reference.

BACKGROUND

1. Field

Embodiments relate to a display device. More particularly, the embodiments relate to the display including a data driver.

2. Description of the Related Art

The display device is a device that displays an image for providing visual information to a user. The display device includes a liquid crystal display device (LCD), an organic light emitting display device (OLED), and the like. Recently, the display device including a micro light emitting diode (micro LED), a micro organic light emitting diode (micro OLED), an organic light emitting diode on silicon wafer substrate (OLEDoS), a light emitting diode on silicon wafer substrate (LEDoS), and the like, has attracted attention.

Meanwhile, the display device includes a display panel including a plurality of pixels. In addition, the display device includes a gate driver and a data driver for driving the display panel. The plurality of pixels are arranged in a display area of the display device, and components of the data driver are arranged in a non-display area of the display device. As the components of the data driver are arranged in the non-display area, the area of the display area of the display device may decrease.

SUMMARY

Embodiments provide a display device with an expanded display area.

A display device according to an embodiment includes: a substrate including a display area and a non-display area adjacent to the display aera; a plurality of data drivers disposed in the display area on the substrate and each including, a first latch disposed adjacent to one side of the display area facing the non-display area, a shift register spaced apart from the first latch in a first direction and that sequentially outputs an output signal, and a second latch spaced apart from the shift register in the first direction; a plurality of pixels disposed in the display area on the substrate and disposed between elements of the data drivers adjacent to each other, where the elements include the first latch, the shift register, and the second latch; and a plurality of first data lines disposed in the non-display area on the substrate, adjacent to the first latch, connected to the data drivers, and to which a data signal in a digital form is applied.

In an embodiment, the display device may further include a gamma driver overlapping at least a portion of the non-display area, and spaced apart from each of the data drivers and pixels in a second direction intersecting with the first direction.

In an embodiment, the gamma driver may include a gamma voltage generator overlapping the display area, and a gamma amplifier overlapping at least a portion of the non-display area, and adjacent to the gamma voltage generator.

In an embodiment, the gamma voltage generator may be spaced apart from each of the data drivers and the pixels in the second direction, and the gamma voltage generator and the gamma amplifier may be spaced apart from each other in the second direction In an embodiment, the display area may include first, second, third, and fourth display areas located at outermost edges of the display area, and spaced apart from each other and a fifth display area located between the first, the second, the third, the fourth display areas.

In an embodiment, the pixels may overlap the first, the second, the third, the fourth, and the fifth display areas, and the first latch, the second latch, and the shift register may overlap the first, the second, the third, and the fourth display areas, not the fifth display area.

In an embodiment, a gap between pixels adjacent in the first direction among the pixels located in the first, the second, the third, and the fourth display areas may be relatively longer than a gap between pixels adjacent in the first direction among the pixels located in the fifth display areas.

In an embodiment, the elements of the data drivers may be disposed between the pixels, and may further include a plurality of digital-analog converters and a demux circuit overlapping the first, the second, the third, and the fourth display areas.

In an embodiment, the demux circuit may be disposed adjacent to the fifth display area.

In an embodiment, the pixels may be arranged in a second direction intersecting with the first direction, and the digital-analog converters may be arranged alternately with the pixels in the first direction.

In an embodiment, the data drivers may further include a level shifter, and the level shifter may be disposed between the second latch and a digital-analog converter adjacent to the second latch among the plurality of digital-analog converters In an embodiment, the display device may further include: an encapsulation layer disposed on the pixels and the data drivers and overlapping the display area and the non-display area, and the non-display area may include a first non-display area overlapping the encapsulation layer, and a second non-display area not overlapping the encapsulation layer.

In an embodiment, the first data lines may overlap the first non-display area.

In an embodiment, the display device may further include: a plurality of second data lines electrically connected to the data drivers and the pixels, and to which a data voltage in an analog form is applied, and the first data lines and the second data lines may be spaced apart from each other.

A display device according to an embodiment includes: a substrate including a display area and a non-display area adjacent to the display aera, and including a silicon wafer; a plurality of data drivers disposed in the display area on the substrate and each including a first latch disposed adjacent to one side of the display area facing the non-display area, a shift register spaced apart from the first latch in a first direction and which sequentially outputs an output signal, and a second latch spaced apart from the shift register in the first direction; a plurality of pixels disposed in the display area on the substrate and disposed between elements of the data drivers adjacent to each other, where the elements include the first latch, the shift register, and the second latch; a plurality of first data lines disposed in the non-display area on the substrate, adjacent to the first latch, and to which a data signal in a digital form is applied; and a plurality of second data lines electrically connected to the data drivers and the pixels, and to which a data voltage in an analog form is applied.

In an embodiment, the display device may further include a gamma driver overlapping at least a portion of the non-display area, and spaced apart from each of the data drivers and the pixels in a second direction intersecting with the first direction In an embodiment, the gamma driver may include a gamma voltage generator overlapping the display area, and a gamma amplifier overlapping at least a portion of the non-display area, and adjacent to the gamma voltage generator In an embodiment, the elements of the data drivers may be disposed between the pixels, and may further include a plurality of digital-analog converters and a demux circuit overlapping the display area.

In an embodiment, the display device may further include an encapsulation layer disposed on the pixels and the data drivers and overlapping the display area and the non-display area, and the non-display area may include a first non-display area overlapping the encapsulation layer, and a second non-display area not overlapping the encapsulation layer.

In an embodiment, the first data lines overlap the first non-display area.

In a display device according to embodiments of the present disclosure, the display device may include a display area and a first non-display area, and data drivers may be disposed in the display area. Accordingly, a separate area where the data drivers are arranged is not required, the integration density of semiconductor chips included in the display device is effectively improved, and an area of the display area may be increased.

In addition, a first data line may be disposed in the first non-display area, and a first latch may be disposed adjacent to the first data line, in an outermost portion of the display area. Accordingly, the first latch may quickly store a data signal in a digital form received from the first data line.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
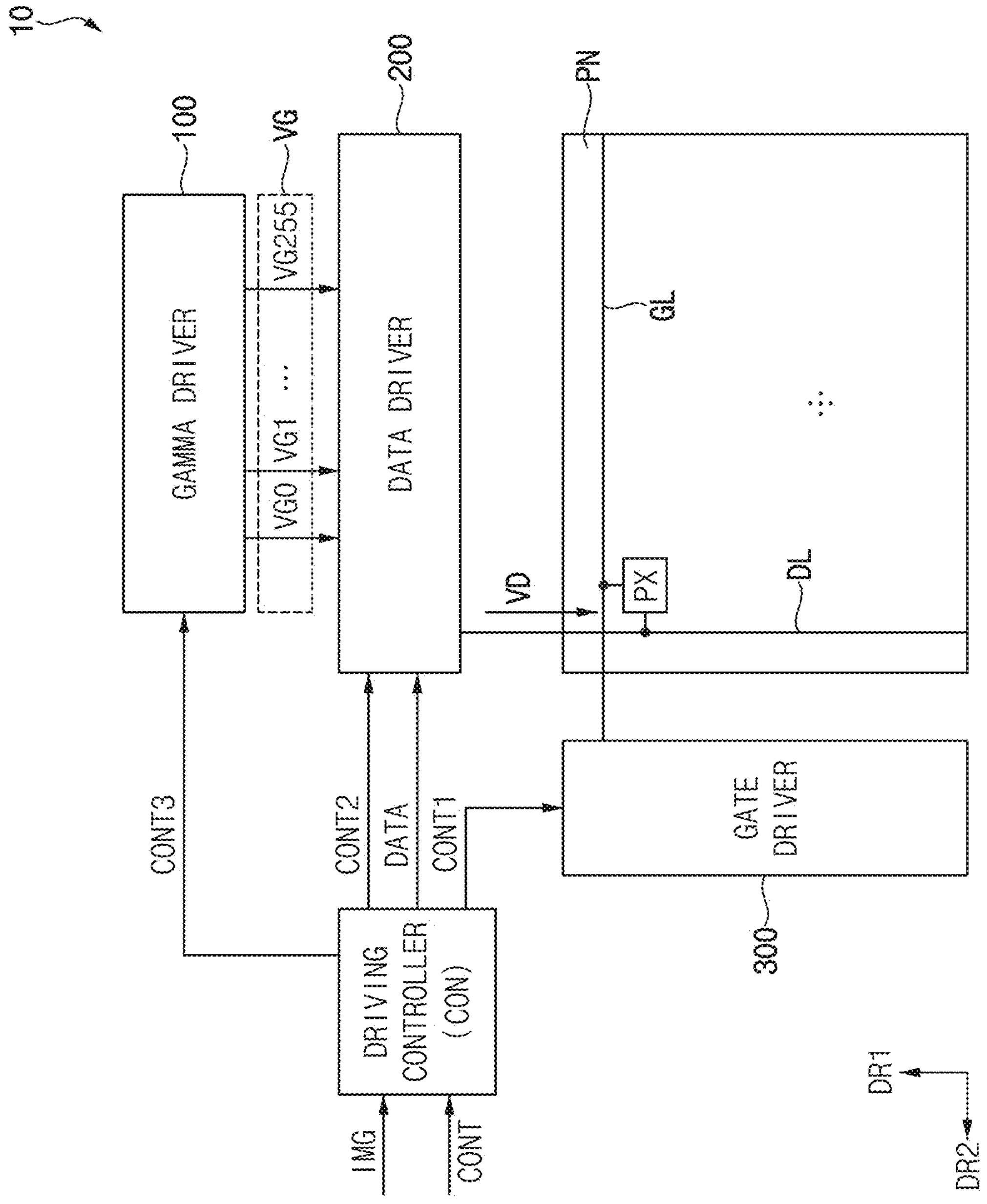
FIG. 1 is a block diagram illustrating driving of a display device according to an embodiment of the present disclosure.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

It will be understood that when an element is referred to as being "on" another element or "connected to" another element, it can be directly on or directly connected to the other element or intervening elements may be present therebetween. In contrast, when an element is referred to as being "directly on" another element, there are no intervening elements present.

Hereinafter, display devices in accordance with embodiments will be described in more detail with reference to the accompanying drawings. The same reference numerals are used for the same components in the drawings, and redundant descriptions of the same components will be omitted.

FIG. 1 is a block diagram illustrating driving of a display device according to an embodiment of the present disclosure.

Referring to FIG. 1, a display device 10 may include a display panel PN and a display panel driver. The display panel driver may include a driving controller CON, a gamma driver 100, a data driver 200, and a gate driver 300.

In this specification, a plane may be defined by a first direction DR1 and a second direction. For example, the second direction DR2 may be perpendicular to the first direction DR1.

The display device 10 may further include a plurality of first data lines (e.g., the first data lines 280) to which a data signal DATA in a digital form is applied, a plurality of gate lines GL, a plurality of second data lines DL, and a plurality of pixels electrically connected to each of the gate lines GL and the second data lines DL. Each of the second data lines DL may be extended along the first direction DR1, and each of the gate lines GL may extended along the second direction DR2.

In an embodiment, the first data lines 280 and the second data lines DL may be spaced apart from each other.

Figure 2:
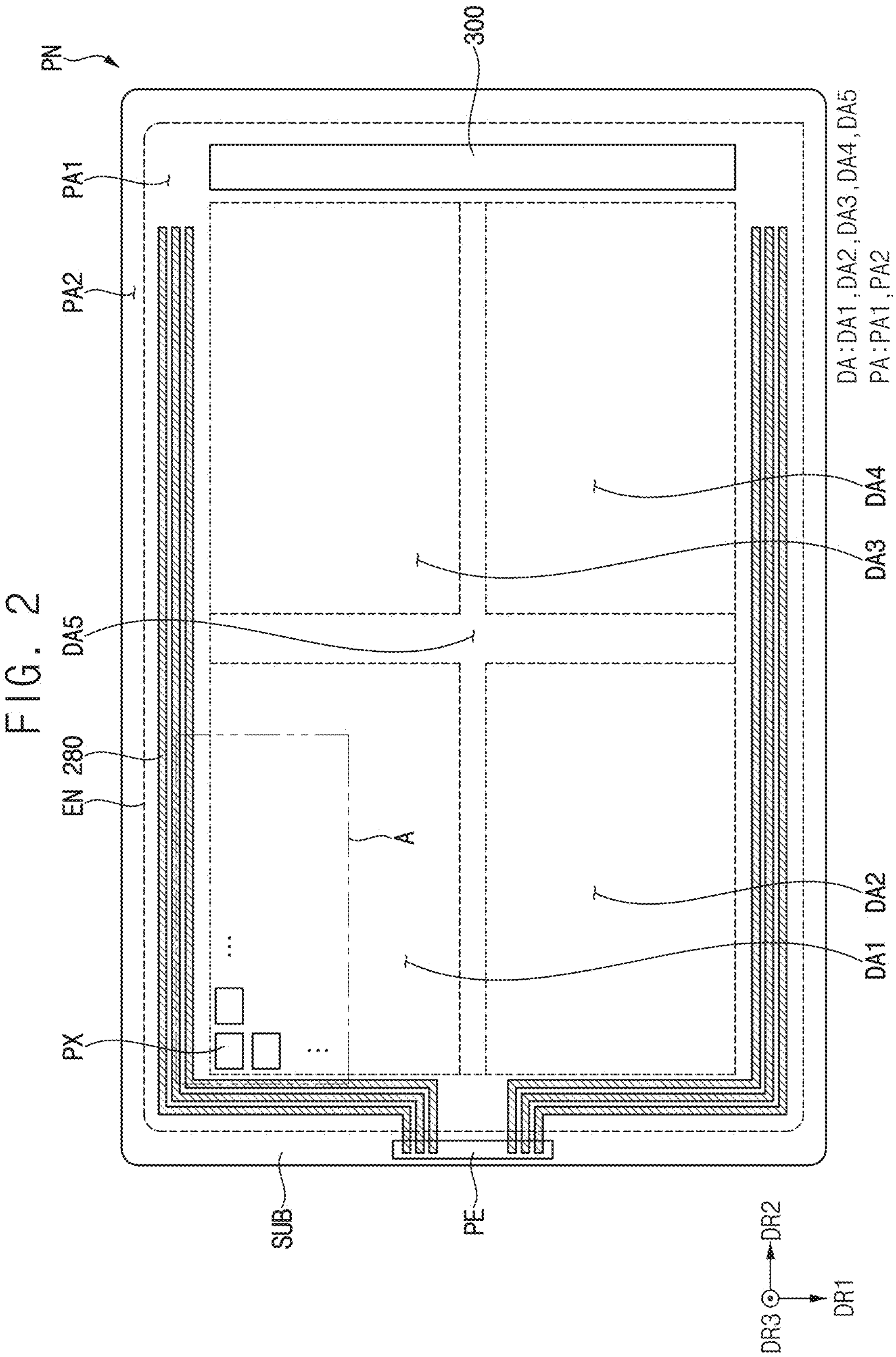
FIG. 2 is a plan view of the display device in FIG. 1.

In an embodiment, one component of the gamma driver 100 may be disposed in a display area (e.g., the display area DA in FIG. 2). In addition, other component of the gamma driver 100 except for the one component may be disposed in a non-display area (e.g., the non-display area PA in FIG. 2)

In an embodiment, one component of the data driver 200 may be disposed in the display area. In addition, other component of the data driver 200 except for the one component may be disposed in the non-display area. The gate driver 300 may be disposed in the display area.

The driving controller CON may receive an input image data IMG and an input control signal CONT from an external device (not shown). For example, the input image data IMG may include a red (R) image data, a green (G) image data, and a blue (B) image data. The input image data IMG may include a white image data. The input image data IMG may include a magenta image data, a yellow image data, and a cyan image data. The input control signal CONT may include a master clock signal and a data enable signal. The input control signal CONT may further include a vertical synchronization signal and a horizontal synchronization signal.

The driving controller CON may generate a first control signal CONT1, a second control signal CONT2, a third control signal CONT3, and the data signal DATA in the digital form based on the input image data IMG and the input control signal CONT.

The driving controller CON may generate the first control signal CONT1 for controlling the driving of the gate driver 300 based on the input control signal CONT and may output the first control signal CONT1 to the gate driver 300. The first control signal CONT1 may include a vertical start signal and a gate clock signal.

The driving controller CON may generate the second control signal CONT2 for controlling the driving of the data driver 200 based on the input control signal CONT and may output the second control signal CONT2 to the data driver 200. The second control signal CONT2 may include a horizontal start signal and a load signal.

The driving controller CON may generate the data signal DATA in the digital form based on the input image data IMG. The driving controller CON may output the data signal DATA to the data driver 200. For example, the driving controller CON may output the data signal DATA to the data driver 200 through the first data lines 280.

The driving controller CON may generate the third control signal CONT3 for controlling the driving of the gamma driver 100 based on the input control signal CONT and may output the third control signal CONT3 to the gamma driver 100.

The gate driver 300 may generate gate signals for driving the gate lines GL in response to the first control signal CONT1 received from the controller CON. The gate driver 300 may output the gate signals to the gate lines GL. For example, the gate driver 300 may output the gate signals to the gate lines sequentially.

The gamma driver 100 may generate a gamma reference voltage VG in response to the third control signal CONT3 received from the driving controller CON. The gamma driver 100 may supply the gamma reference voltage VG generated from the gamma driver 100 to the data driver 200. The gamma reference voltage VG may have a value corresponding to each of the data signal DATA. The gamma reference voltage VG may have 256 potentials from a first gamma reference voltage VG0 to a 256th gamma reference voltage VG255. However, the present disclosure may not be limited to this.

The data driver 200 may receive the second control signal CONT2 and the data signal DATA from the driving controller CON, and the gamma reference voltage VG from the gamma driver 100. The data driver 200 may convert the data signal DATA into a data voltage VD in an analog form using the gamma reference voltage VG. The data driver 200 may output the data voltage VD to the second data lines DL.

Figure 3:
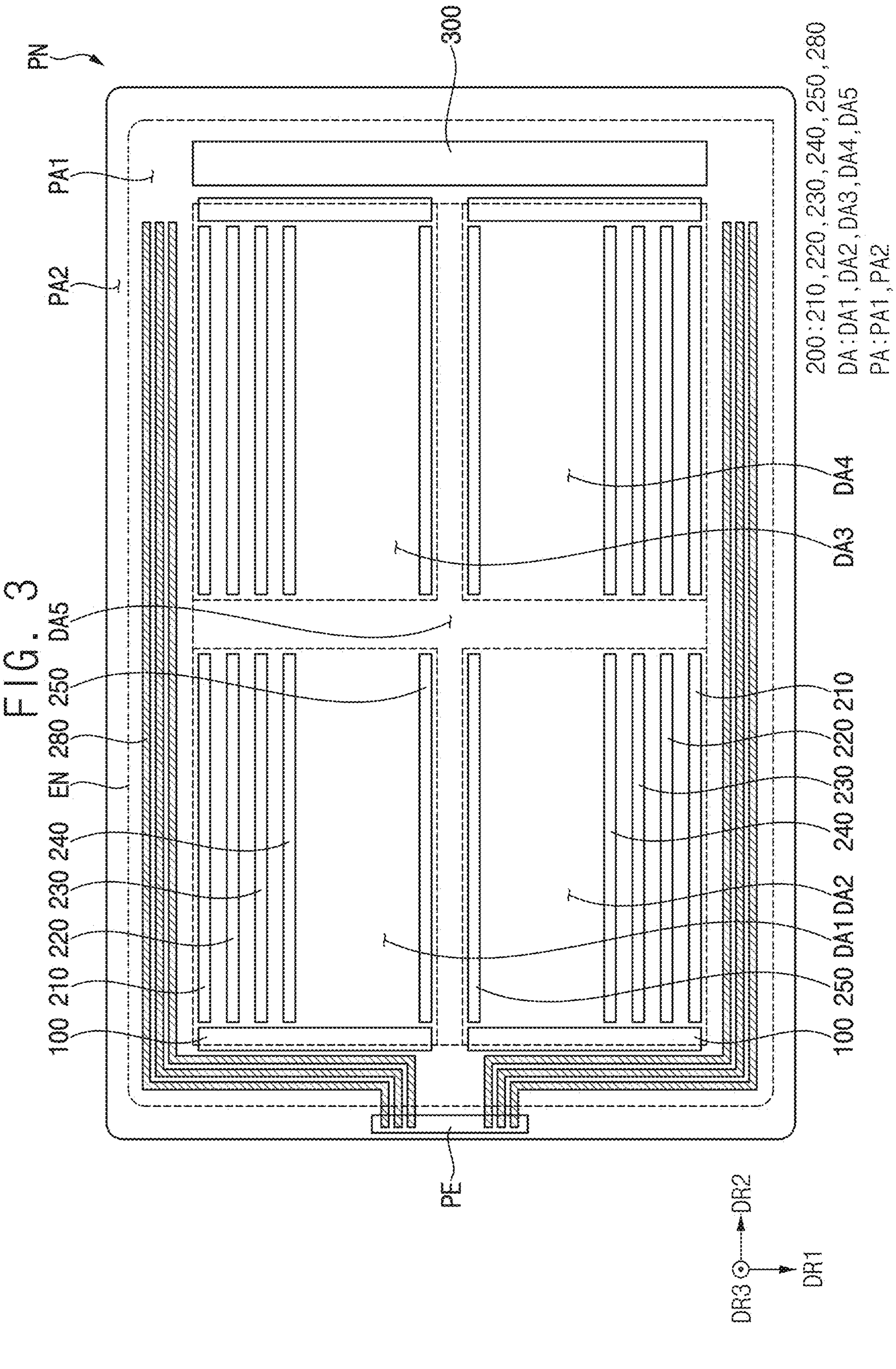
FIG. 3 is a plan view of a data driver included in the display device in FIG. 1.

FIG. 2 is a plan view of the display device in FIG. 1. FIG. 3 is a plan view of a data driver included in the display device in FIG. 1. As used herein, the "plan view" is a view in a thickness direction (i.e., third direction DR3) of the substrate SUB.

Referring to FIGS. 2 and 3, the display device (e.g., the display device 10 in FIG. 1) may include a substrate SUB, the display panel PN, and an encapsulation layer EN.

The substrate SUB may include a silicon wafer. However, the present disclosure may not be limited to this, and the substrate may include a glass, a plastic, and the like.

The display panel PN may disposed on the substrate SUB. The display panel PN may be a display panel for an organic light emitting diode on silicon wafer substrate (OLEDoS), and a light emitting diode on silicon wafer substrate (LEDoS). However, the present disclosure may not be limited to this, and the display panel PN may be an organic light emitting display panel including an organic light emitting diode (OLED), or a micro light emitting display panel including a micro light emitting diode (micro LED), or a quantum dot light emitting display panel including a quantum dot light diode.

The encapsulation layer EN may be disposed on the display panel PN. The encapsulation layer EN may protect the display panel PN. The encapsulation layer EN may include an inorganic insulating material. For example, the inorganic insulating material may include a silicon nitride, silicon oxide, and the like. However, the present disclosure may not be limited to this, the encapsulation layer EN may include a glass.

The display panel PN of the display device may include the display area DA and the non-display area PA. Accordingly, the substrate SUB disposed under the display panel PN may include the display area DA and the non-display area PA. The non-display area PA may be located adjacent to the display area DA. For example, the non-display area PA may surround the display area entirely.

The display area DA may be defined as an area which generates an image. The plurality of pixels PX may disposed in the display area DA. Each of the pixels PX may emit a light. The image may be generated by the light which each of the pixels PX emits, in the display area DA. The pixels may be arranged along the first direction DR1 and the second direction DR2.

The display area DA may include a first display area DA1, a second display area DA2, a third display area DA3, a fourth display area DA4, and a fifth display area DA5. Each of the first display area DA1, the second display area DA2, the third display area DA3, and the fourth display area DA4 may be disposed in an outermost portion of the display area DA. For example, each of the first display area DA1, the second display area DA2, the third display area DA3, and the fourth display area DA4 may be disposed adjacent to four edge areas included in the display aera DA.

In an embodiment, the first display area DA1, the second display area DA2, the third display area DA3, and the fourth display area DA4 may be spaced apart from each other. For example, the second display area DA2 may be spaced apart from the first display area DA1 in the first direction DR1. The third display area DA3 may be spaced apart from the first display area DA1 in the second direction DR2. The fourth display area DA4 may be spaced apart from the second display area DA2 in the second direction DR2. The fourth display area DA4 may be spaced apart from the third display area DA3 in the first direction DR1.

The fifth display area DA5 may be located in an area among the display area DA except for the first to the fourth display areas DA1, DA2, DA3, and DA4. For example, the first display area DA1 and the third display area DA3 may be symmetric with respect to an imaginary line which crosses a center of the fifth display area DA5 and is parallel to the first direction DR1. In addition, the second display area DA2 and the fourth display area DA4 may be symmetric with respect to the imaginary line which crosses the center of the fifth display area DA5 and is parallel to the first direction DR1.

The first display area DA1 and the second display area DA2 may be symmetric with respect to an imaginary line which crosses a center of the fifth display area DA5 and is parallel to the second direction DR2. In addition, the third display area DA3 and the fourth display area DA4 may be symmetric with respect to the imaginary line which crosses the center of the fifth display area DA5 and is parallel to the second direction DR2.

The non-display area PA may include a first non-display area PA1 and a second non-display area PA2. The first non-display area PA1 may be disposed adjacent to the display area DA. For example, the first non-display area PA1 may surround the display area DA. The second non-display area PA2 may be disposed adjacent to the first non-display area PA1. For example, the second non-display area PA2 may surround the first non-display area PA1. In addition, a boundary of the first non-display area PA1 adjacent to the second non-display area PA2 may be a boundary of the encapsulation layer EN included in the display device. That is, the encapsulation layer EN may overlap the display area DA and the first display are PA1. In addition, the encapsulation layer EN may not overlap the second non-display area PA2.

The second non-display area PA2 may include a pad area PE. The pad area PE may located from one side of the first non-display area PA1 in a direction opposite to the second direction DR2. The pad area PE may include a flexible printed circuit, and a driving chip involved in the transmission of electrical signals.

The data drivers 200 may be disposed in the first to the fourth display areas DA1, DA2, DA3, and DA4, respectively. Each of the data drivers 200 may include a first latch 210, a shift register 220, a second latch 230, a digital-analog converter 240, and first data lines 280. Each of the data drivers 200 in FIG. 3 may correspond to the data driver 200.

At least one of the first latch 210 may disposed in each of the first to the fourth display areas DA1, DA2, DA3, and DA4. For example, the first latch 210 may be disposed in all of the first to the fourth display areas DA1, DA2, DA3, and DA4. However, the present inventio may not be limited to this.

The first latch 210 may be adjacent to the non-display are PA in the display area DA. That is, the first latch 210 may be disposed in an outer most of each of the first to the fourth display areas DA1, DA2, DA3, and DA4. For example, the first latch 210 may be disposed adjacent to one side of the first display area DA1 facing a direction opposite to the first direction DR1, in the first display area DA1. The first latch 210 may be disposed adjacent to one side of the second display area DA2 facing the first direction DR1, in the second display area DA2. The first latch 210 may be disposed adjacent to one side of third display area DA3 facing a direction opposite to the first direction DR1, in the third display area DA3. The first latch 210 may be disposed adjacent to one side of the fourth display area DA4 facing the first direction DR1, in the fourth display area DA4.

The first latch 210 in the first display area DA1 and the first latch 210 in the second display area DA2 may be symmetric with respect to with respect to the imaginary line which crosses the center of the fifth display area DA5 and is parallel to the second direction DR2. In addition, the first latch 210 in the third display area DA3 and the first latch 210 in the fourth display area DA4 may be symmetric with respect to with respect to the imaginary line which crosses the center of the fifth display area DA5 and is parallel to the second direction DR2.

A circuit component included in the first latch may be arranged along the second direction DR2, in the first to the fourth display areas DA1, DA2, DA3, and DA4. However, the first latch 210 may not be disposed in the fifth display area DA5.

At least one of the shift register 220 may be disposed in each of the first to the fourth display areas DA1, DA2, DA3, and DA4. For example, the shift register 220 may be disposed in all of the first to the fourth display areas DA1, DA2, DA3, and DA4. However, the present disclosure may not be limited to this.

The shift register 220 may be spaced apart from the first latch 210 in the first direction DR1 or a direction opposite to the first direction DR1. For example, the shift register 220 may be spaced apart from the first latch in the first direction DR1, in the first and the third display areas DA1 and DA3. In addition, the shift register may be spaced apart from the first latch 210 in the direction opposite to the first direction DR1, in the second and the fourth display areas DA2 and DA4.

A circuit component included in the shift register 220 may be arranged along the second direction DR2, in the first to the fourth display areas DA1, DA2, DA3, and DA4. However, the shift register 220 may not be disposed in the fifth display area DA5.

The plurality of pixels PX may be disposed between the shift register 220 and the first latch 210. Pixels PX may be arranged along the second direction DR2 in the display area DA located between the shift register 220 and the first latch 210. Each of the pixels PX may be spaced apart from each of the shift register 220 and the first latch 210 in the first direction DR1 or the direction opposite to the first direction DR1.

At least one of the second latch 230 may be disposed in each of the first to the fourth display areas DA1, DA2, DA3, and DA4. For example, the second latch 230 may be disposed in all of the first to the fourth display areas DA1, DA2, DA3, and DA4. However, the present disclosure may not be limited to this.

The second latch 230 may be disposed to be spaced apart from the shift register 220 in a direction opposite to a direction from the shift register 220 to the first latch 210. The second latch 230 may be spaced apart from the shift register 220 in the first direction DR1 or a direction opposite to the first direction DR1. For example, the second latch 230 may be spaced apart from shift register 220 in the first direction DR1, in the first and the third display areas DA1 and DA3. In addition, the second latch 230 may be spaced apart from the shift register 220 in the first direction DR1, in the second and the fourth display areas DA2 and DA4.

A circuit component included in the second latch may be arranged along the second direction DR2, in the first to the fourth display areas DA1, DA2, DA3, and DA4. However, the second latch 230 may not be disposed in the fifth display area DA5.

The pixels PX may be disposed between the second latch 230 and the shift register 220. The pixels PX may be arranged along the second direction in the display area DA located between the second latch 230 and the shift register 220. Each of the pixels PX may be spaced apart from each of the second latch 230 and the shift register 220 in the first direction DR1 or the direction opposite to the first direction DR1.

At least one of the digital-analog converter 240 may be disposed in each of the first to the fourth display areas DA1, DA2, DA3, and DA4. For example, the digital-analog converter 240 may be disposed in all of the first to the fourth display areas DA1, DA2, DA3, and DA4. However, the present disclosure may not be limited to this.

The digital-analog converter 240 may be disposed to apart from the second latch 230 in a direction opposite to a direction from the second latch 230 to the shift register 220. The digital-analog converter 240 may be spaced apart from the second latch in the first direction DR1 or the direction opposite to the first direction DR1. For example, the digital-analog converter 240 may be spaced apart from the second latch 230 in the first direction DR1, in the first and third display area DA1 and DA3. In addition, the digital-analog converter 240 may be disposed apart from the second latch 230 in the direction opposite to the first direction DR1, in the second and the fourth display area DA2 and DA4.

The first data lines 280 may be lines which the digital signal (e.g., the digital signal DATA in FIG. 1) in the digital form. In addition, the first data lines 280 may be disposed in the non-display aera PA. Specifically, the first data lines may be disposed in the first non-display area PA. That is, the first data lines 280 may not be disposed in the second non-display area PA2. The first data lines 280 may be disposed under the encapsulation layer. In addition, the first data lines 280 may be disposed to overlap the encapsulation layer EN in a plan view. Accordingly, the first data lines 280 may be protected by the encapsulation layer EN.

The first data lines 280 may be disposed to be adjacent to the outermost edges of the display area DA. The first data lines 280 may be disposed to be adjacent to the first latch 210. For example, the first data lines 280 may be disposed to be spaced apart from the first latch 210 disposed in the first and the third display areas DA1 and DA3 in the direction opposite to the first direction DR1. In addition, the first data lines 280 may be disposed to be spaced apart from the first latch 210 disposed in the second and the fourth display area DA2 and DA4 in the first direction DR1. According to the first data lines 280 may be adjacent to the first latch 210, the first latch 210 may receive the data signal in the digital form rapidly.

According to components (e.g., the first latch 210, the shift register 220, the second latch 230, and the digital-analog converter 240) of the data drivers 200 may be disposed in the display area DA, the first data lines 280 may be adjacent to the display area DA.

However, when the first data lines 280 are disposed in the display area DA, an electromagnetic coupling phenomena may generate. In order to prevent electromagnetic coupling phenomena, the first data lines 280 may be disposed in the non-display aera PA1.

For example, the first data lines 280 may transmit the digital signal in the digital form which is 8 bits. For example, the first data lines may transmit signals to the pixels PX which emit the red (R) light, the green (G) light, and the blue (B) light. The first data lines 280 may include 24 lines transmitting the signals to each of the pixels which emit the red (R) light, the green (G) light, and the blue (B) light. However, the present disclosure may not be limited to a number of the data lines bits and a number of the data lines.

The first data lines 280 may be extended from the pad area PE located in the non-display area DA, and may surround at least a portion of the display area DA, The first data lines 280 may be disposed to be adjacent to the first and the second display areas DA1 and DA2, and may be arranged to be parallel to the second direction DR2. In addition, the first data lines 280 may be disposed to be adjacent to the third and the fourth display areas DA3 and DA4, and may be arranged to be parallel to the second direction DR2. However, the first data lines 280 may not be extended in the second direction to an area where the gate driver 300 is located. Specifically, the first data lines 280 may not overlap the gate driver 300 in the first direction DR1.

The gamma driver 100 may be disposed in the non-display area PA and the display area DA. For example, the gamma driver 100 may overlap at least a portion of the first non-display area PA1. In addition, the gamma driver 100 may be disposed in each of the first to the fourth display areas DA1, DA2, DA3, and DA4. The gamma driver 100 may be disposed to be adjacent to one side perpendicular to another side of the display area DA where the first latch 210 is located. However, the gamma driver 100 may not be disposed in the fifth display area DA5.

The gamma driver 100 may be spaced apart from each of the data drivers 200 and the pixels PX in the second direction DR2 or a direction opposite to the second direction DR2. For example, the first and the second display areas DA1 and DA2 may be spaced apart from each of the data drivers 200 and the pixels PX in the direction opposite to the second direction DR2. The gamma driver 100 may be spaced apart from each of the data drivers 200 and the pixels PX in the second direction DR2.

The gamma driver 100 may be adjacent to the first data lines 280. The gamma driver 100 may be spaced apart from the first data lines 280 in the second direction DR2. Accordingly, the gamma driver 100 may transmit electric signals to the first data lines 280 or receive electric signals from the first data lines 280.

Figure 4:
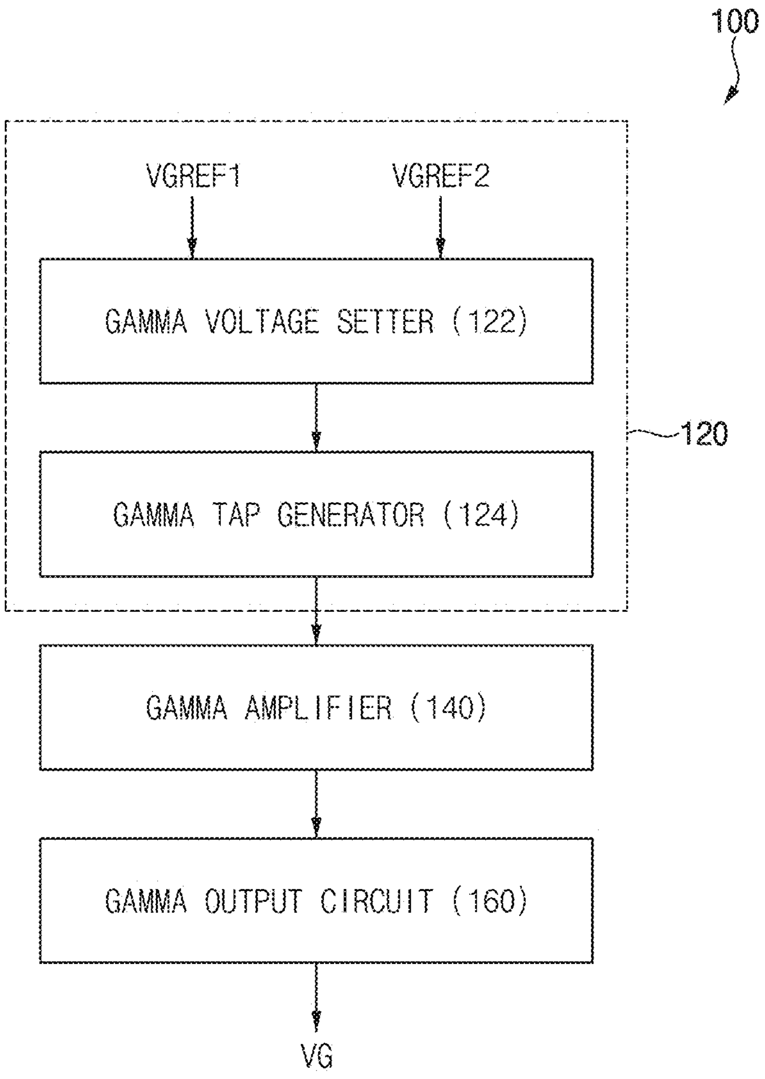
FIG. 4 is a plan view illustrating a gamma driver in FIG. 1.
Figure 5:
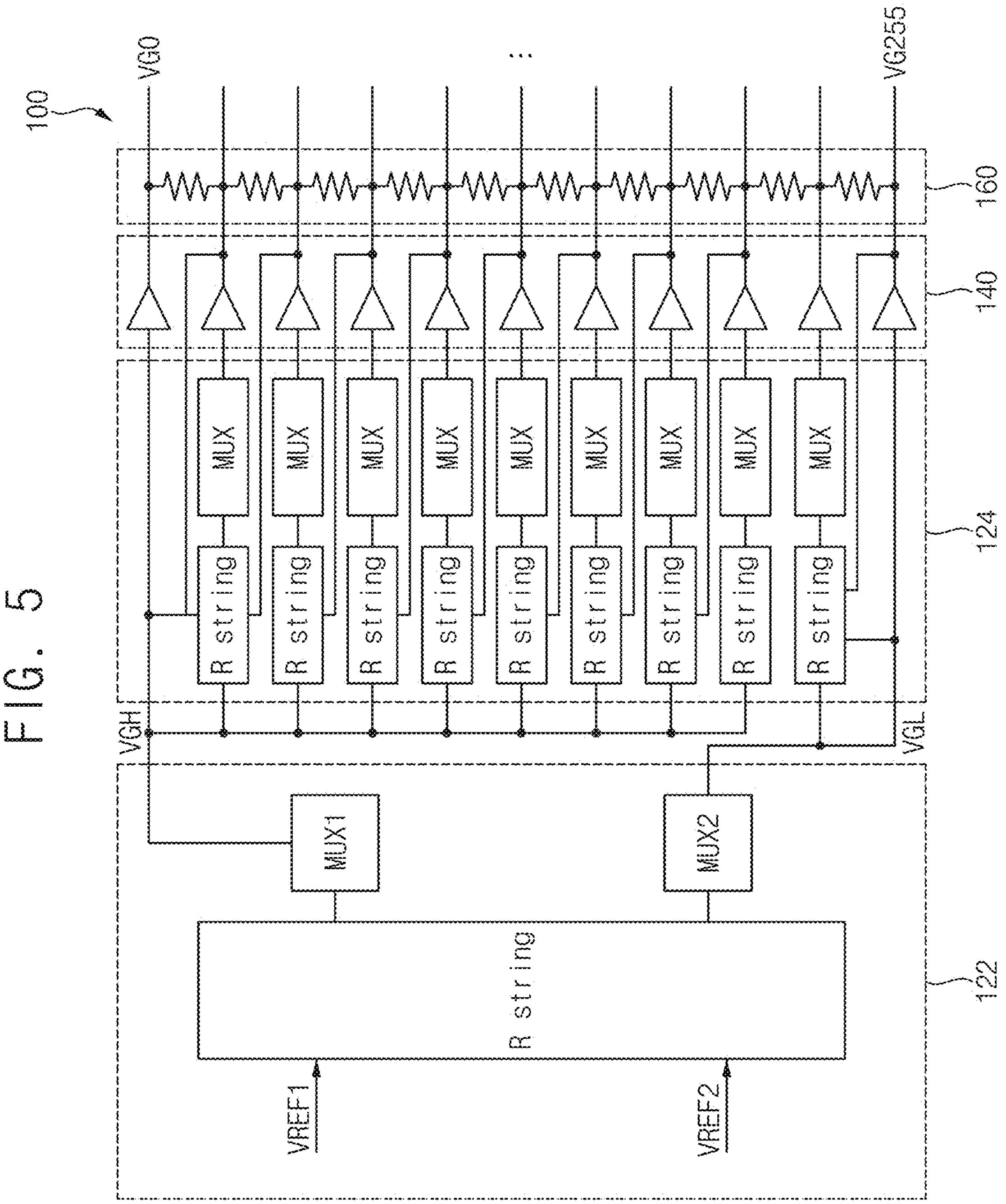
FIG. 5 is a circuit diagram illustrating a gamma driver in FIG. 1.

FIG. 4 is a plan view illustrating a gamma driver in FIG. 1. FIG. 5 is a circuit diagram illustrating a gamma driver in FIG. 1.

Referring to FIGS. 4 and 5, the gamma driver 100 may include a gamma voltage generator 120, a gamma amplifier 140, and a gamma output circuit 160. The gamma voltage generator 120 may include a gamma voltage setter 122 and a gamma tap generator 124.

The gamma voltage setter 122 may receive a first reference voltage VREF1 and a second reference voltage VREF2. The gamma voltage setter 122 may select a high gamma reference voltage VGH and a low gamma reference voltage VGL based on the third control signal CONT3. The high gamma reference voltage VGH may be defined as a gamma voltage corresponding to a highest grayscale gamma tap voltage among voltages between the first reference voltage VGREF1 and the second reference voltage VREF2. In addition, the low gamma reference voltage VGL may be defined as a gamma voltage generated based on a maximum gray level of the input image data IMG in one frame and a set luminance.

The gamma voltage setter 122 may include a resistance string Rstring, a first reference selector MUX1, and a second reference selector MUX2. The resistance string Rstring may distribute the first reference voltage VREF1 and the second reference voltage VREF2. The resistance string Rstring may include a plurality of resistances in series with each other. The first reference voltage VREF1 and the second reference voltage VREF2 may applied to both ends of the resistance string Rstring. A plurality of voltages may be distributed and output at contact points of resistances included in the resistance string Rstring.

The first reference selector MUX1 may select one of voltages distributed by the resistance string Rstring as the high gamma reference voltage VGH based on the third control signal CONT3. The first reference selector MUX1 may select a gamma reference voltage corresponding to gradation 0 of the input image data IMG as the high gamma reference voltage VGH. The gamma reference voltage corresponding to the 0 gray scale may be referred to as a voltage level corresponding to the 0 gray scale.

The second reference selector MUX2 may receive a plurality of voltages relatively close to the second reference voltage VREF2 from the resistance string Rstring. The second reference selector MUX2 may select and output the low gamma reference voltage VGL based on the plurality of voltages received and a set luminance. The low gamma reference voltage VGL may correspond to a voltage level of a set luminance. For example, each of the first reference selector MUX1 and the second reference selector MUX2 may be a multiplexer that selects and outputs one of the plurality of input voltages. However, although two reference selector are shown in FIG. 5, the present disclosure may not be limited this.

The gamma tap generator 124 may receive the high gamma reference voltage VGH output from the first reference selector MUX1 and the low gamma reference voltage VGL output from the second reference selector MUX2. The gamma tap generator 124 may divide the high gamma reference voltage VGH and the low gamma reference voltage VGL, select intermediate gamma voltages among the divided voltages, and generate and output the gamma tap voltages. That is, the gamma tap generator 124 may generate the gamma tap voltages based on the high gamma reference voltage VGH and the low gamma reference voltage VGL.

The gamma tap generator 124 may include a plurality of resistance strings Rstring and a plurality of selectors MUX. The plurality of resistance strings Rsrting may distribute the high gamma reference voltage VGH and the low gamma reference voltage VGL into a plurality of voltage sections. Accordingly, the plurality of resistance strings Rsrting may be connected to each other in a dependent manner to distribute voltages to a plurality of voltage sections.

The plurality of reference selectors MUX may select one of voltages distributed to each of the plurality of resistance strings Rstring based on a plurality of gamma tap selection signals. For example, the plurality of selectors MUX may be a multiplexer that selects one of a plurality of input voltages. In this case, the gamma tap selection signals may be selected according to user input or external input, or may be stored during the manufacturing process.

The gamma amplifier 140 may include a plurality of amplifiers. The gamma amplifier 140 may output voltages selected from the plurality of reference selectors MUX included in the gamma tap generator 124 as the gamma tap voltages.

The gamma tap generator 124 and the gamma amplifier 140 may include a plurality of stages. For example, the gamma tap generator 124 and the gamma amplifier 140 may include stages that output the gamma tap voltages. Specifically, when the gamma tap voltages include first to tenth gamma tap voltages, the stages may include first to tenth stages that output the gamma tap voltages. The first stage may output the high gamma reference voltage VGH as the first gamma tap voltage. The first gamma tap voltage may correspond to a first gamma voltage V0 having a 0th gray level.

Each of K-th stages that output a K-th gamma tap voltage (e.g., K is a natural number between 2 and 9) may include resistance strings (Rstring), a plurality of reference selectors MUX, and the gamma amplifier included in the gamma amplifier 140. The K-th stage may distribute the first gamma tap voltage and a (K+1)th gamma tap voltage using the resistance string Rstrinig, select one of the distributed voltages through the reference selector MUX, and output a selected voltage as the K-th gamma tap voltage through the gamma amplifier.

The 10th stage may output the low gamma reference voltage VGL as a 10th gamma tap voltage. For example, the 10th gamma tap voltage may correspond to the 256th gamma voltage V255 having a 255th gray scale.

The gamma amplifier 140 may amplify and transmit an electrical signal to pixels (e.g., the pixels PX in FIGS. 1 and 2). The gamma amplifier 140 may amplify or charge the electrical signal to the pixels PX using the gamma reference voltage VG.

The gamma output circuit 160 may divide the gamma tap voltages and output the first gamma voltage V0 to the 256th gamma voltage V255. The gamma output circuit 160 may generate the first gamma voltage V0 to the 256th gamma voltage V255 by dividing the gamma tap voltages using the plurality of resistance strings. However, the present disclosure may not be limited to a number of gamma voltages that the gamma output circuit 160 generates. For example, the gamma output circuit 160 may generate 2048 gamma voltages.

Figure 6:
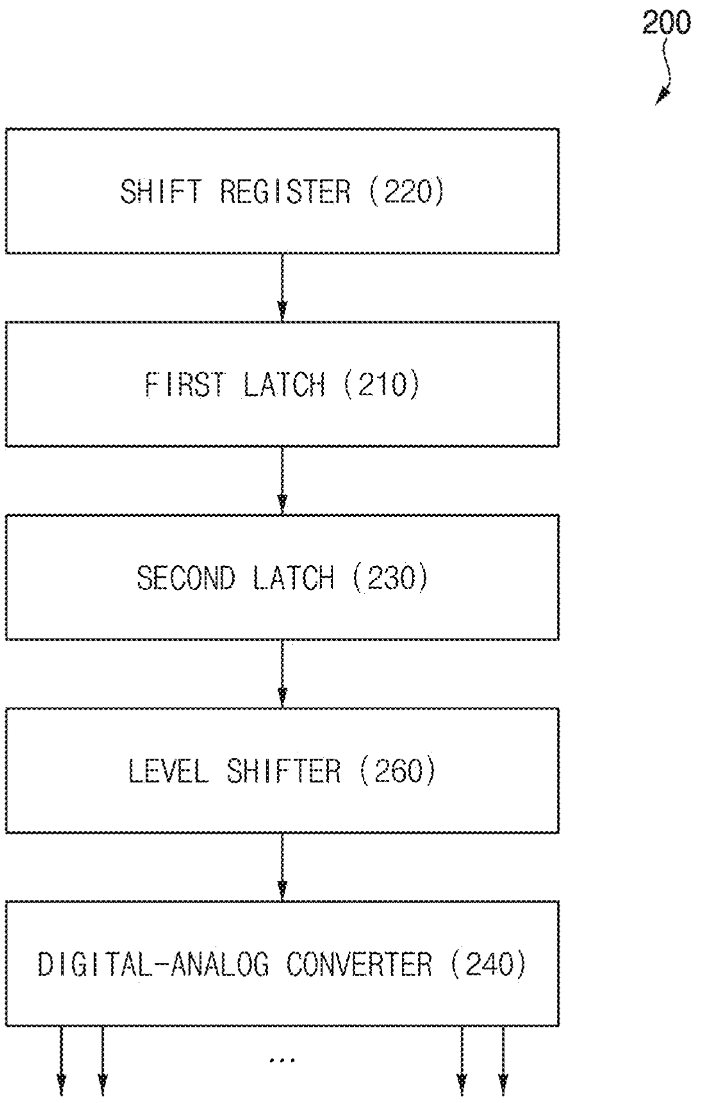
FIG. 6 is a block diagram illustrating a data driver in FIG. 3.
Figure 7:
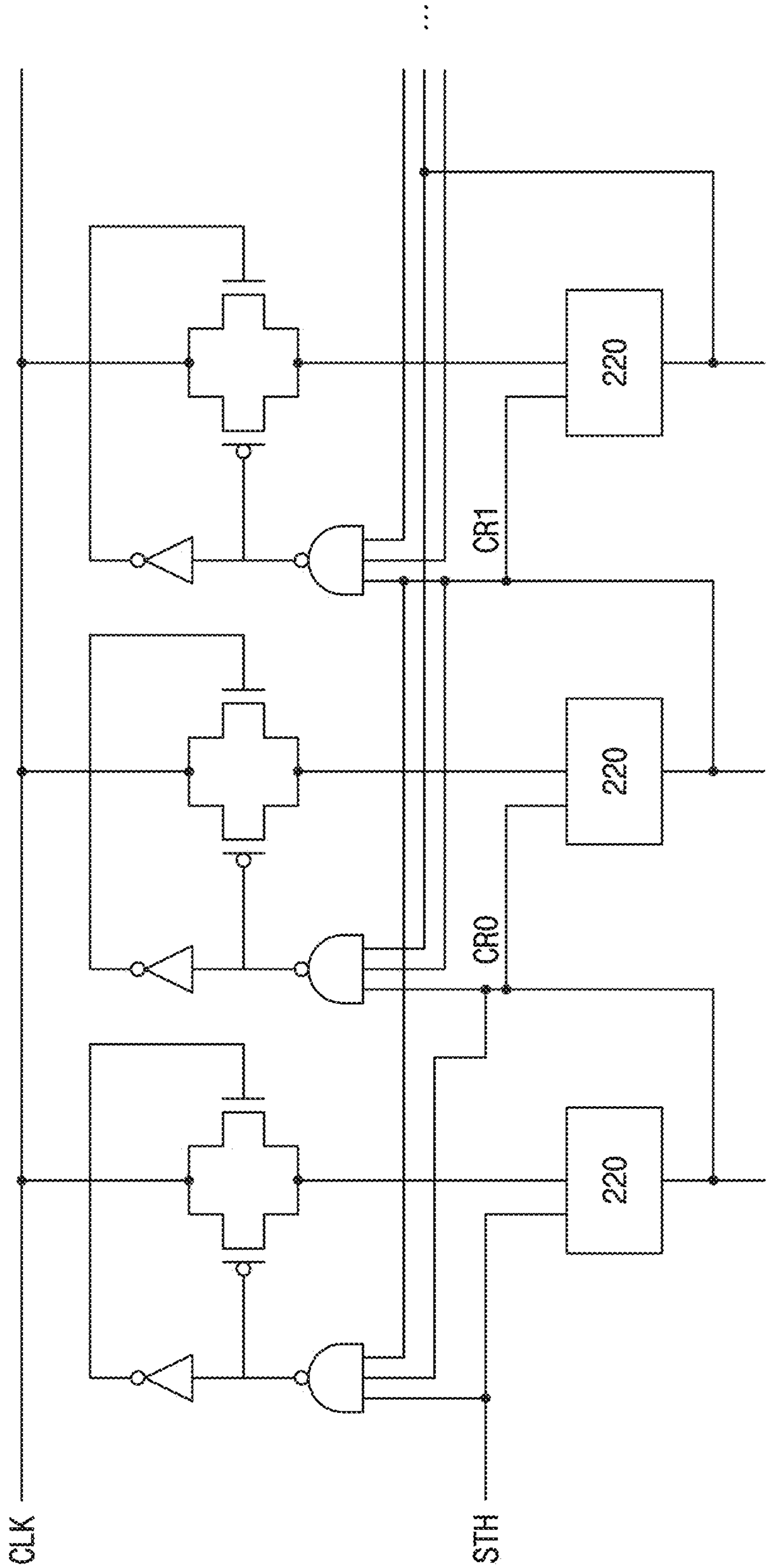
FIG. 7 is a circuit diagram illustrating a shift register in FIG. 6.
Figure 8:
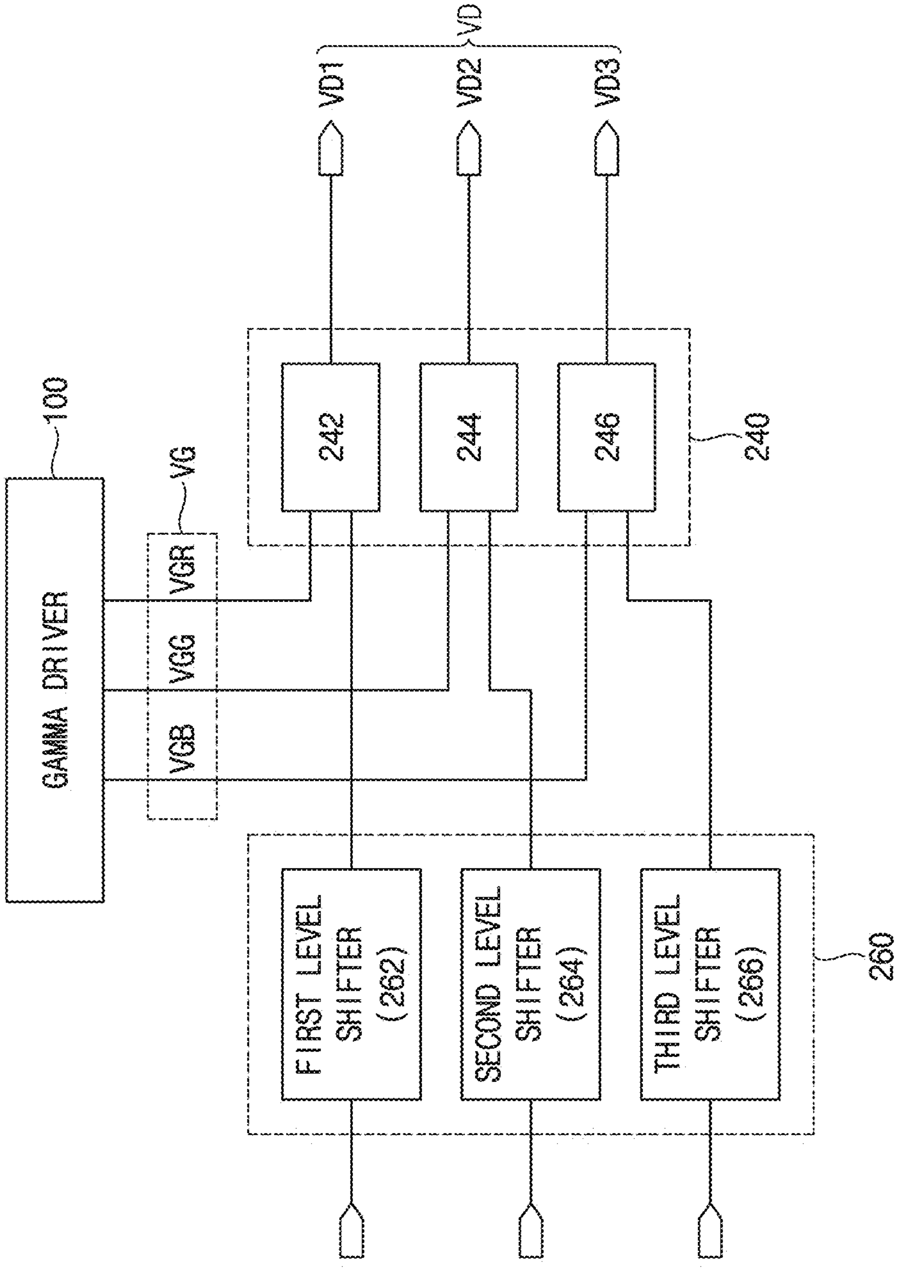
FIG. 8 is a block diagram illustrating a level shifter and a digital-analog converter in FIG. 6.
Figure 9:
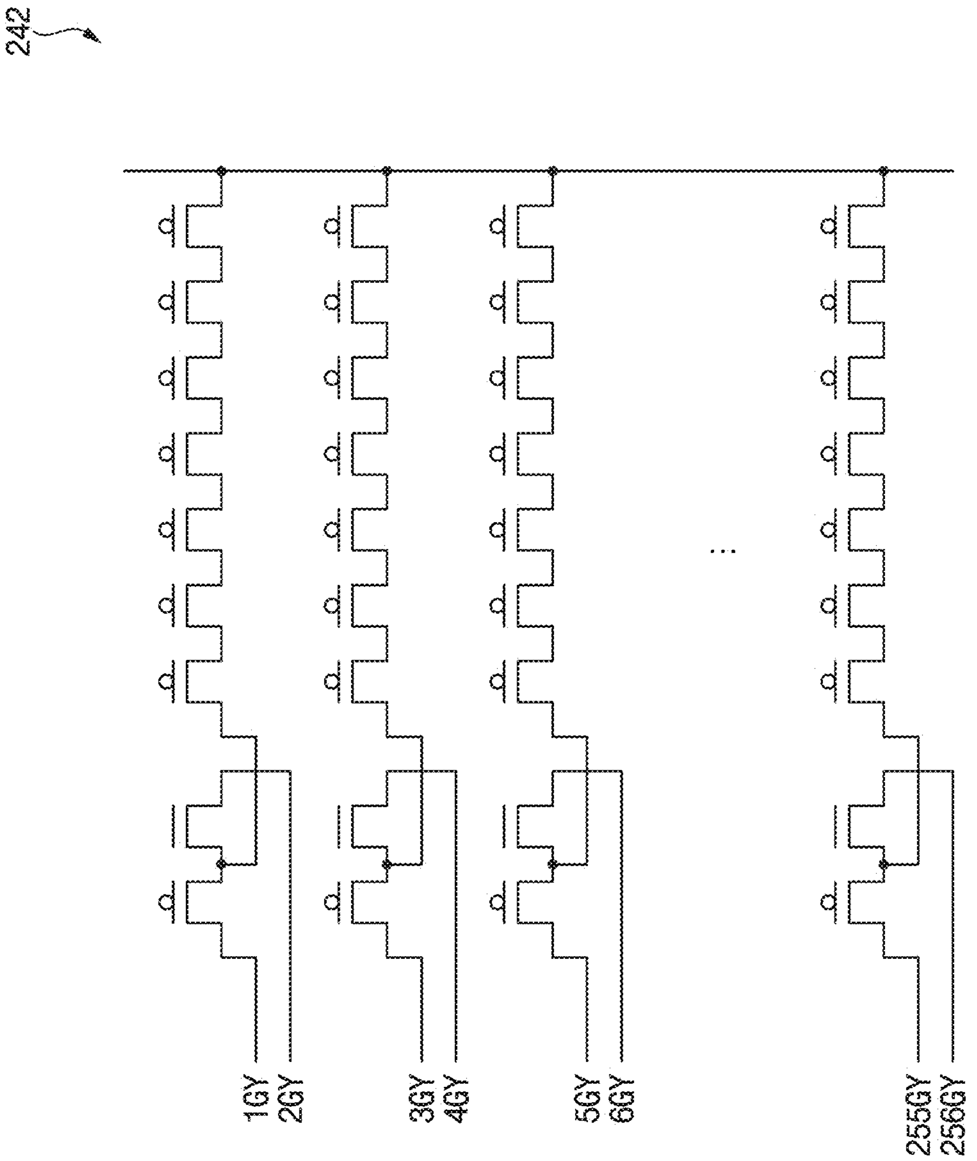
FIG. 9 is a circuit diagram illustrating the digital-analog converter in FIG. 6.

FIG. 6 is a block diagram illustrating a data driver in FIG. 3. FIG. 7 is a circuit diagram illustrating a shift register in FIG. 6. FIG. 8 is a block diagram illustrating a level shifter and a digital-analog converter in FIG. 6. FIG. 9 is a circuit diagram illustrating the digital-analog converter in FIG. 6.

Referring to FIGS. 6, 7, 8, and 9, the data drivers 200 may receive the data signal in the digital form from the first data lines (e.g., the first data lines 280 in FIG. 2) and output an analog signal. For example, the data signal in the digital form may sequentially pass through the shift register 220, the first latch 210, the second latch 230, the level shifter 260, and the digital-analog converter 240, and output as the analog signal.

A plurality of shift registers 220 may be connected in series. The shift register 220 may input a horizontal simultaneous signal STH and a data clock signal CLK. The shift register 220 may shift sequentially sampling signals input according to the data clock signal CLK when the horizontal simultaneous signal STH is applied to the shift register 220. For example, as the shift register 220 may shift horizontal simultaneous signal STH based on the data clock signal CLK in one horizontal period, the shift registers may generate sequentially the sampling signals.

The first latch 210 may sequentially sample a pixel data for the second control signal CONT2 transmitted from the controller CON in response to the sampling signals transmitted from the shift register 220. The first latch 210 may include sampling latches that store the pixel data in response to the sampling signals.

The first latch 210 may be located closer to the first data line than the shift register 220. Accordingly, the first latch 210 may receive the signal transmitted from the first data line before the shift register 220.

A load signal may be applied to the second latch 230. The second latch 230 may store the pixel data sampled by the first latch 210 in response to the load signal. The second latch 230 may include a plurality of holding latches corresponding to each of the sampling latches included in the first latch 210.

The level shifter 260 may change a voltage level of the pixel data output from the second latch 230. For example, the level shifter 260 may shift the voltage level to a level suitable for the digital-analog converter 240. The level shifter 260 may include first to third level shifters 262, 264, and 266 to increase the voltage level of the pixel data.

The digital-analog converter 240 may perform digital-to-analog conversion on a shifter output signal output from the level shifter 260. Accordingly, the shifter output signal in a digital form input to the digital-analog converter 240 may be converted into an analog signal.

The gamma driver 100 may output first gamma reference voltages VGR corresponding to a first color, second gamma reference voltages VGG corresponding to a second color, and third gamma reference voltages VGB corresponding to a third color. For example, the first color may be red, the second color may be green, and the third color may be blue.

The digital-analog converter 240 may include a first digital-analog converter 242 corresponding to the first color, a second digital-analog converter 244 corresponding to the second color, and a third digital-analog converter 246 corresponding to the third color.

The first level shifter 262 may increase a level of data signals corresponding to the first color. The data signals and the first gamma reference voltages VGR may be matched to generate a first data voltage VD1.

The second level shifter 264 may increase a level of data signals corresponding to the second color. The data signals and the second gamma reference voltages VGG may be matched to generate a second data voltage VD2.

The third level shifter 266 may increase a level of data signals corresponding to the third color. The data signals and the third gamma reference voltages VGB may be matched to generate a third data voltage VD3. The first to third data voltages may output to the first data lines.

The first digital-analog converter 242 may include nine transistors. The first digital-analog converter 242 may include 128 switches. In addition, the first digital-analog converter 242 may include a first grayscale 1GY to a 256th grayscale 256GY. However, the present disclosure may not be limited to the number of transistors, switches, and gray levels shown in FIG. 9.

An output signal output from the first level shifter 262 may be input to the first digital-analog converter 242. In this case, the first digital-analog converter 242 can select one of the first grayscale 1GY to the 256th grayscale 256GY. A selected gray level may generate the first data voltage VD1. However, the present disclosure may not be limited to the first digital-analog converter 242, and the second digital-analog converter 244 and the third digital-analog converter 246 are substantially the same as the first digital-analog converter 242.

The data voltage in the analog form (e.g., the data voltage VD in FIG. 1) may be generated using the first data voltage VD1, the second data voltage VD2, and the third data voltage VD3. The data voltage may be applied to second data lines (e.g., second data lines DL in FIG. 1) and transmitted to the pixels PX through the second data lines.

Figure 10:
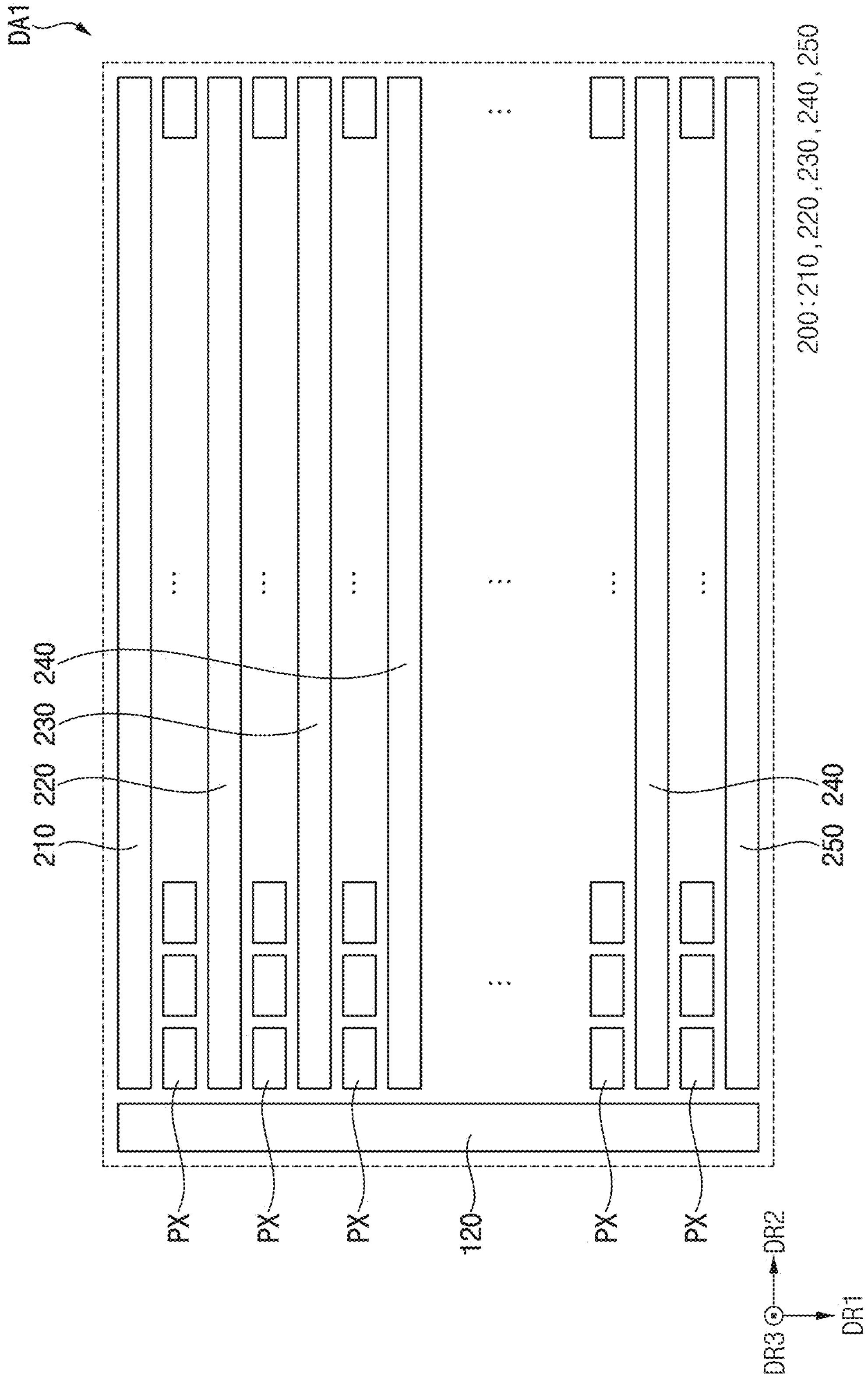
FIG. 10 is a plan view illustrating an enlarged example of a first display area in FIG. 2.
Figure 11:
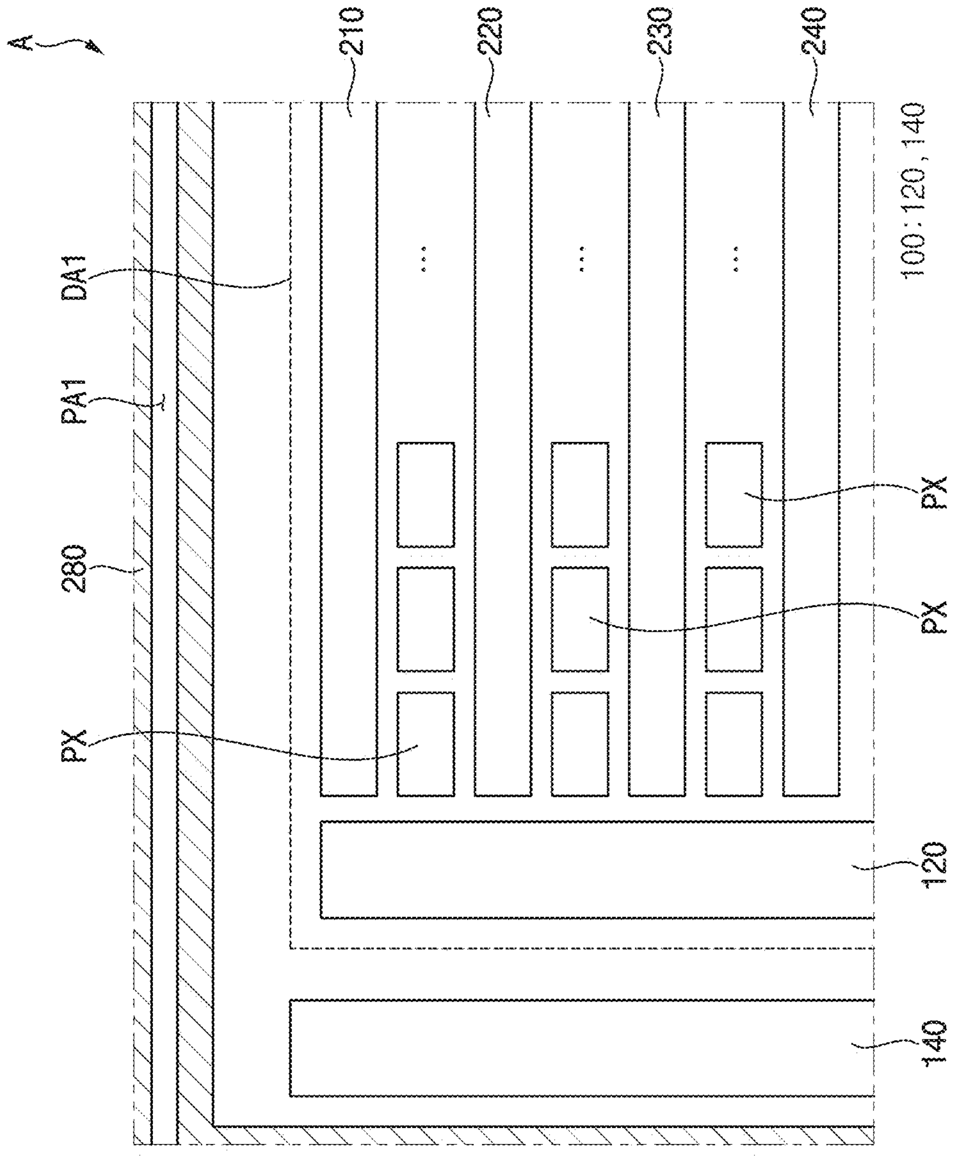
FIG. 11 is a plan view illustrating an enlarged example of area A in FIG. 2.
Figure 12:
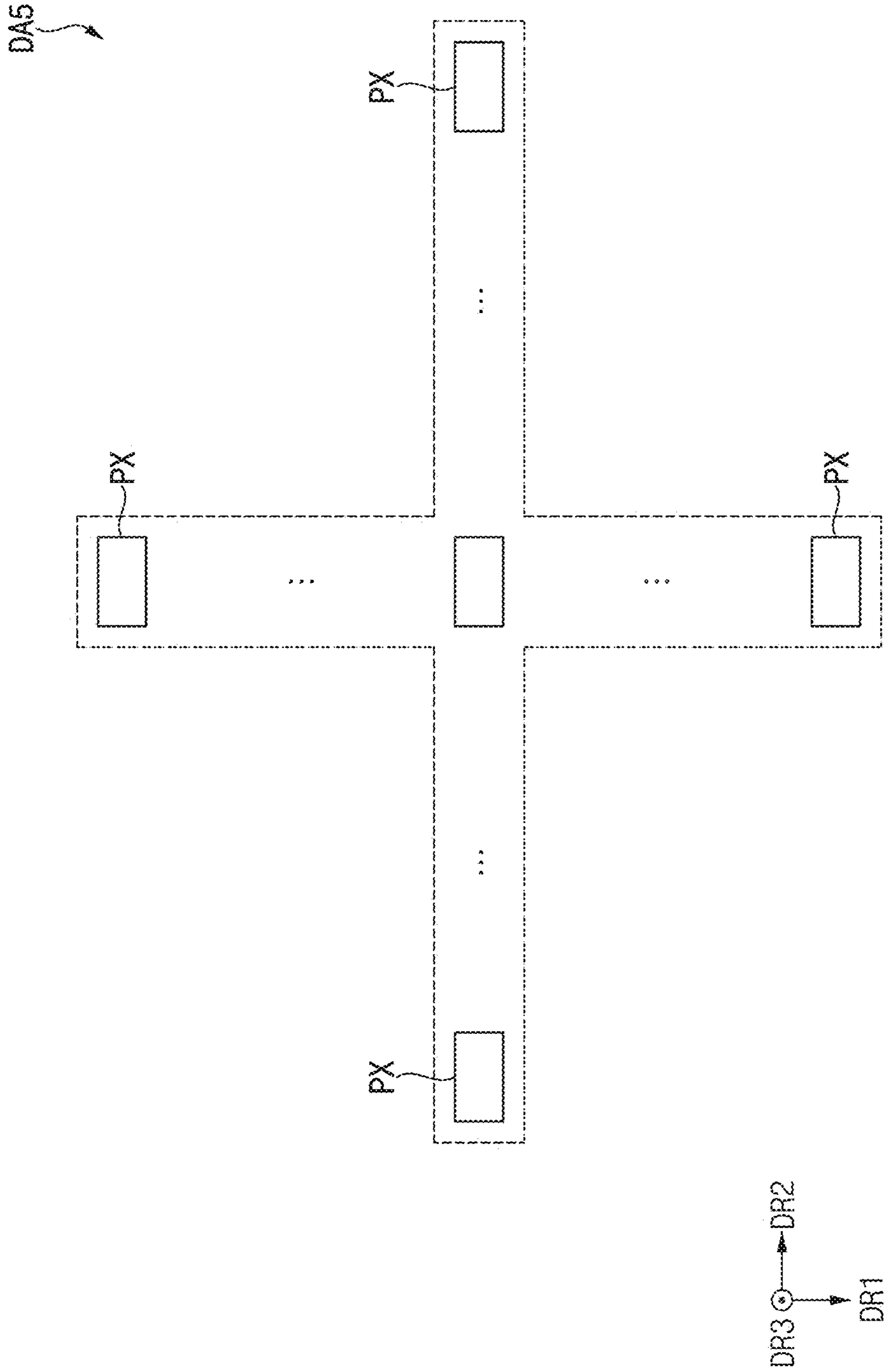
FIG. 12 is a plan view illustrating fifth display area in FIG. 2.

FIG. 10 is a plan view illustrating an enlarged example of a first display area in FIG. 2. FIG. 11 is a plan view illustrating an enlarged example of area A in FIG. 2. FIG. 12 is a plan view illustrating fifth display area in FIG. 2.

Hereinafter, descriptions that overlaps the descriptions described with reference to the FIGS. 2 and 3 will be omitted or simplified.

Referring to FIGS. 10 and 11, a demux circuit may disposed in the first display area DA1. The demux circuit may disposed to be adjacent to one side of the display area DA1 facing the first direction DR1.

In an embodiment, the first latch 210, the pixels PX, the shift register 220, the pixels PX, the second latch 230, the pixels PX, the digital-analog converter 240, the pixels PX, and the demux circuit 250 may be disposed sequentially in the first direction DR1 in this order.

The demux circuit 250 may include a plurality of demux switches. The demux circuit 250 may receive the data voltage (e.g., the data voltage VD in FIG. 1). The demux circuit 250 may time-divide the data voltage and apply the data voltage to second data lines (e.g., the second data lines DL in FIG. 1). For example, the demux circuit 250 may time-divide the data voltage through switching operations of the demux switches and apply the data voltage to the second data lines.

A plurality of digital-analog converters 240 may be arranged in a direction opposite to the direction from the second latch 230 to the shift register 220. As described above, the digital-analog converter 240 may include the first to third digital-analog converters (e.g., the first digital-analog converter 242, the second digital-analog converter 244, and the third digital-analog converter 246 in FIG. 8). For example, each of the first digital-analog converter, the second digital-analog converter, and the third digital-analog converter may be arranged alternately in the first direction DR1. Specifically, a plurality of units consisting of an order the first digital-analog converter, the second digital-analog converter, and the third digital-analog converter may be arranged in the first direction DR1 from the second latch 230 in the first display area DA1. However, the present disclosure may not be limited to an arrangement order of the first to third digital-analog converters.

The gamma voltage generator 120 may be disposed in the first display area DA1. The gamma voltage generator 120 may be spaced apart from each of the pixels PX, the first latch 210, the shift register 220, the second latch 230, and the digital-analog converter 240 in the second direction DR2.

The gamma amplifier 140 may be disposed in the first non-display area PA1. The gamma amplifier 140 may be disposed in the first non-display area PA1 adjacent to one side of the first display area DA1 facing in a direction opposite to the second direction DR2. That is, the gamma amplifier 140 may be disposed adjacent to the first display area DA1. Accordingly, the gamma amplifier 140 may also perform as an amplifier that amplifies a signal transmitted from the digital-analog converter 240 to the pixels PX.

The first data lines 280 may be disposed on one side of the first display area DA1 and adjacent to the gamma amplifier 140. The first data lines 280 may be disposed adjacent to the first latch 210 and the gamma amplifier 140. As the first data lines 280 are disposed adjacent to the first latch 210, the digital data signal transmitted through the first data lines 280 may be rapidly transmitted to the first latch 210 than to the shift register 220.

Although only the first display area DA1 is shown in FIGS. 10 and 11, the second to fourth display areas (e.g., the second to fourth display areas DA2, DA3, and DA4 in FIG. 2) may be substantially the same as the first display area DA1.

Referring to FIG. 12, the fifth display area DA5 may be an area in which the data drivers (e.g., the data drivers 200) may not be disposed. The pixels PX disposed in the first to fourth display areas DA1 to DA4 may be disposed between elements (e.g., the shift register 220, the second latch 230, and the digital-analog converter 240) of the data drivers 200 in the first direction DR1. In an embodiment, a gap between the pixels PX disposed in the first display area DA1, the second display area DA2, the third display area DA3, and the fourth display area DA4 in the first direction DR1 may be relatively longer than a gap between the pixels disposed in the fifth display area DA5 in the first direction DR1 since no element (e.g., the shift register 220, the second latch 230, and the digital-analog converter 240) of the data drivers 200 is located between the pixels disposed in the fifth display area DA5 in the first direction DR1.

In the display device according to an embodiment of the present disclosure, the data drivers 200 may be disposed in the display area DA of the display device 10. Accordingly, a separate area in which the data drivers 200 are disposed may not be required, the integration density of the semiconductor chips included in the display device 10 may increase, and an area of the display area DA may increase.

In addition, the first data lines 280 may be disposed in the first non-display area PA1, and the first latch 210 may be disposed adjacent to the first data lines 280 at an outermost portion of the display area DA. Accordingly, the first latch 210 may quickly store the digital data signal received from the first data lines 280.

Figure 13:
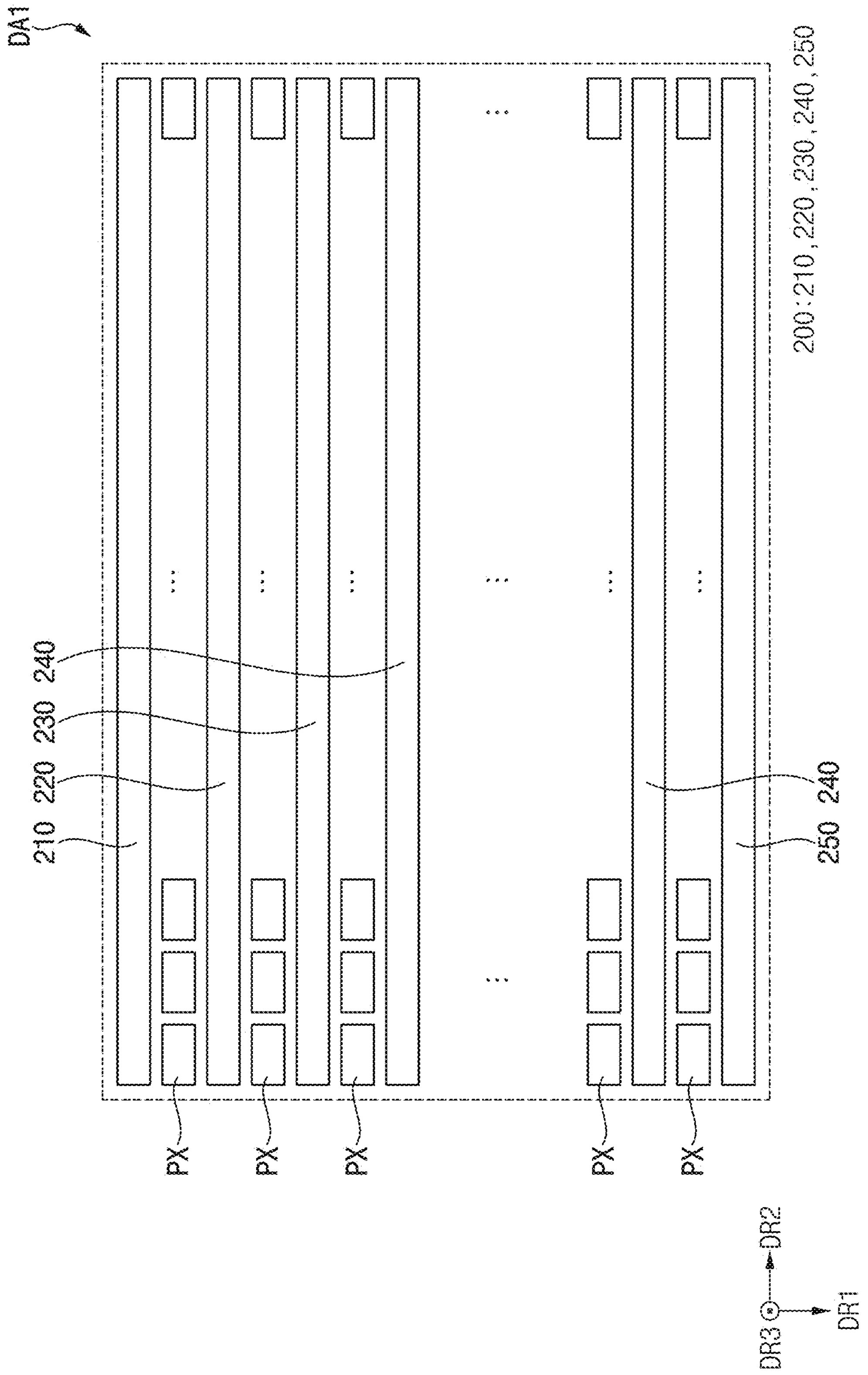
FIG. 13 is a plan view illustrating another enlarged example of a first display area in FIG. 2.
Figure 14:
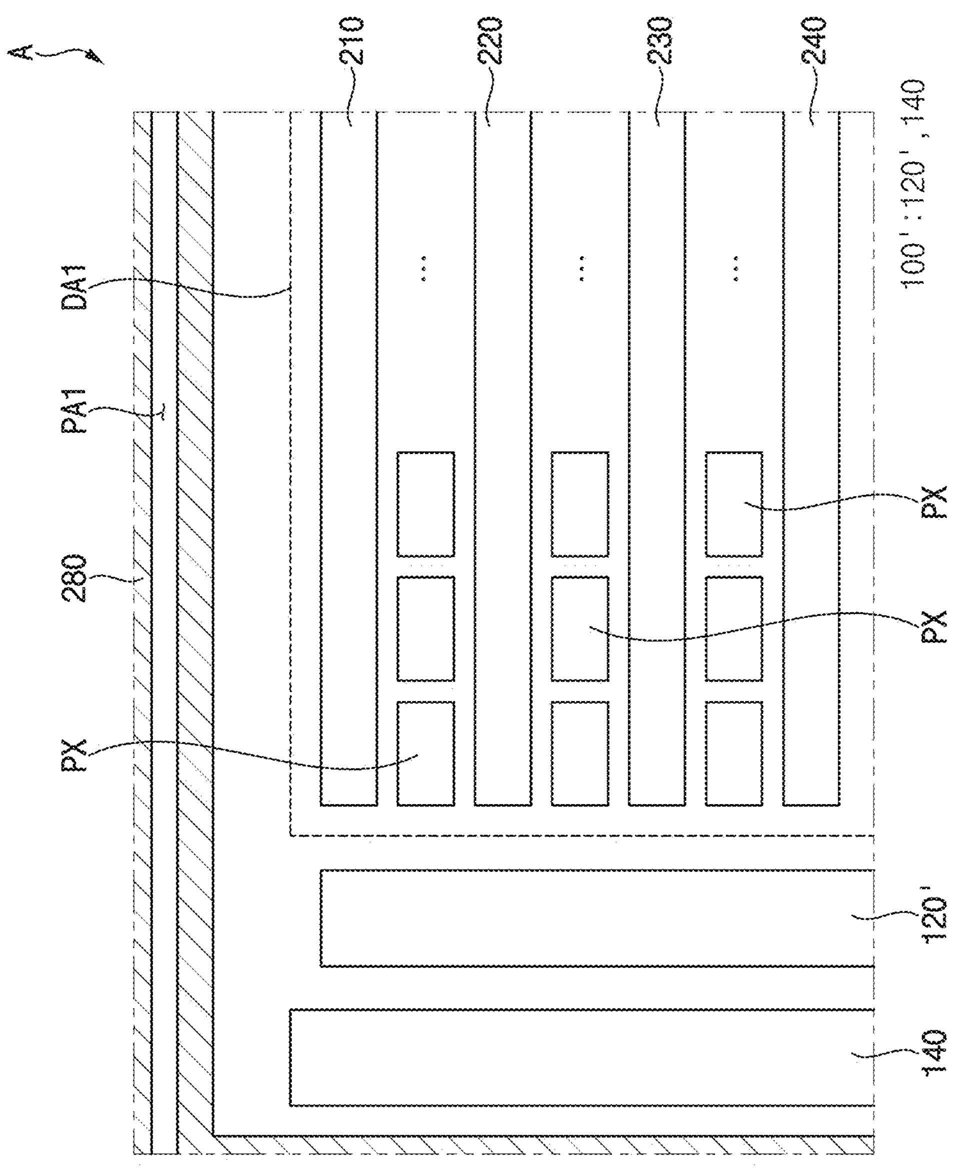
FIG. 14 is a plan view illustrating another enlarged example of area A in FIG. 2.

FIG. 13 is a plan view illustrating another enlarged example of a first display area in FIG. 2. FIG. 14 is a plan view illustrating another enlarged example of area A in FIG. 2.

The display device described with reference to FIGS. 13 and 14 is substantially the same as the display device described with reference to FIGS. 11 and 12 except for an arrangement of the gamma voltage generator 120'.

Hereinafter, contents that overlap with components of the display device described with reference to FIGS. 11 and 12 will be omitted or simplified.

Referring to FIGS. 13 and 14, the gamma voltage generator 120' may be disposed in the first non-display area PA1. The gamma voltage generator 120' may be disposed adjacent to one side of the first non-display area PA1 facing in a direction opposite to the second direction DR2 of the first display area DA1. That is, the gamma voltage generator 120' may not be disposed in the first display area DA1. However, the present disclosure may not be limited to this.

Figure 15:
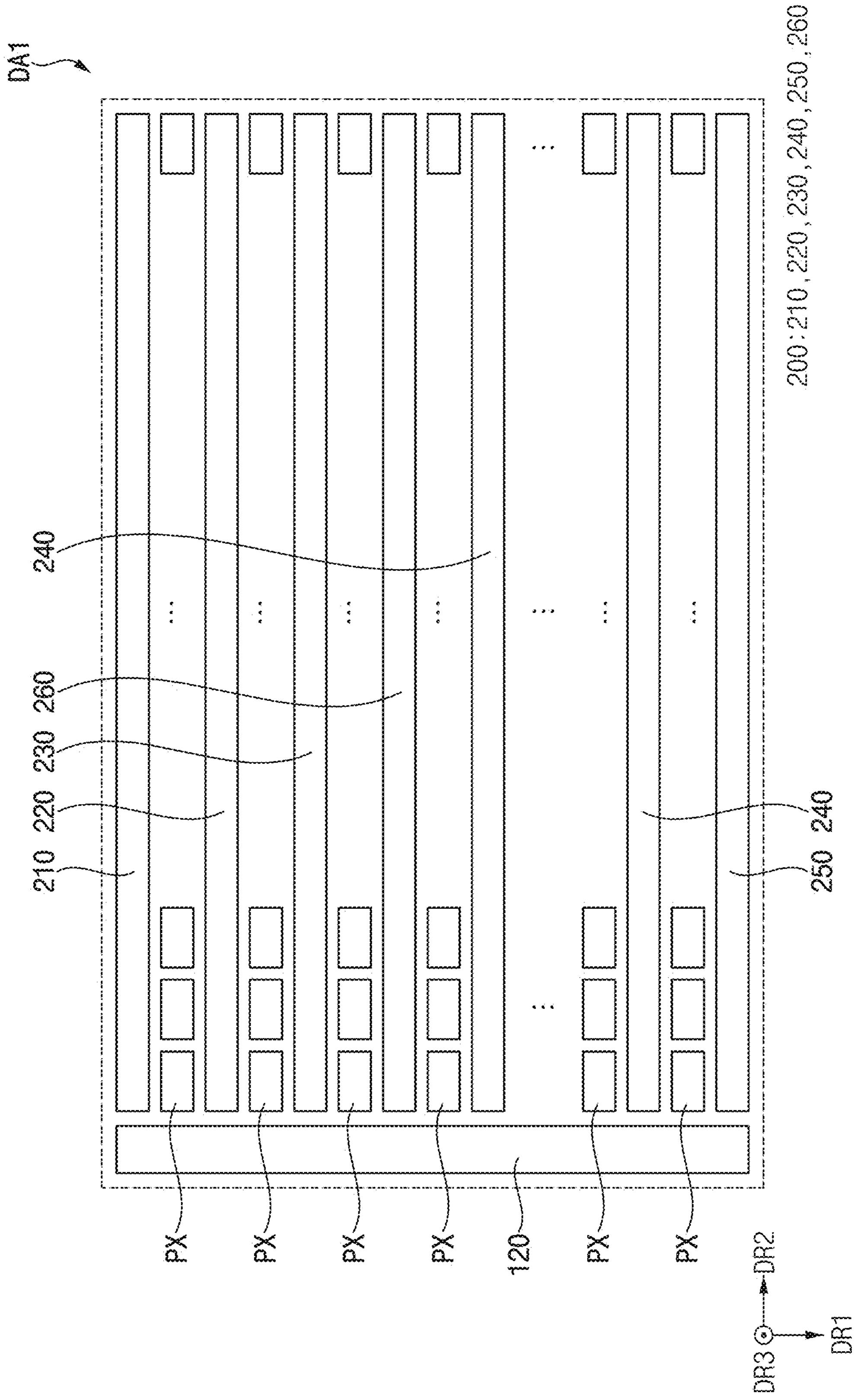
FIG. 15 is a plan view illustrating still another enlarged example of a first display area in FIG. 2.

FIG. 15 is a plan view illustrating still another enlarged example of a first display area in FIG. 2.

The display device described with reference to FIG. 15 is substantially the same as the display device described with reference to FIGS. 11 and 12 except for an arrangement of the level shifter 260.

Hereinafter, contents that overlap with components of the display device described with reference to FIGS. 11 and 12 will be omitted or simplified.

Referring to FIG. 15, the level shifter 260 may be disposed on the first display area DA1. The level shifter 260 may be disposed between the second latch 230 and the digital-analog converter 240. The level shifter 260 may be disposed between the pixels adjacent to the second latch 230 in the first direction DR1 and the pixels PX adjacent to the digital-analog converter 240 in the direction opposite to the first direction DR1.

In the first display area DA1, the first latch 210, the pixels PX, the shift register 220, the pixels PX, the second latch 230, the pixels PX, and the level shifter 260, the pixels PX, the digital-analog converter 240, the pixels PX, and the demux circuit 250 may be arranged sequentially in the first direction DR1.

Although the first display area DA1 are shown in FIG. 15, the second to fourth display areas (e.g., the second to fourth display areas DA2, DA3, Configurations placed in DA4) may also be substantially the same as the first areas DA1.

Figure 16:
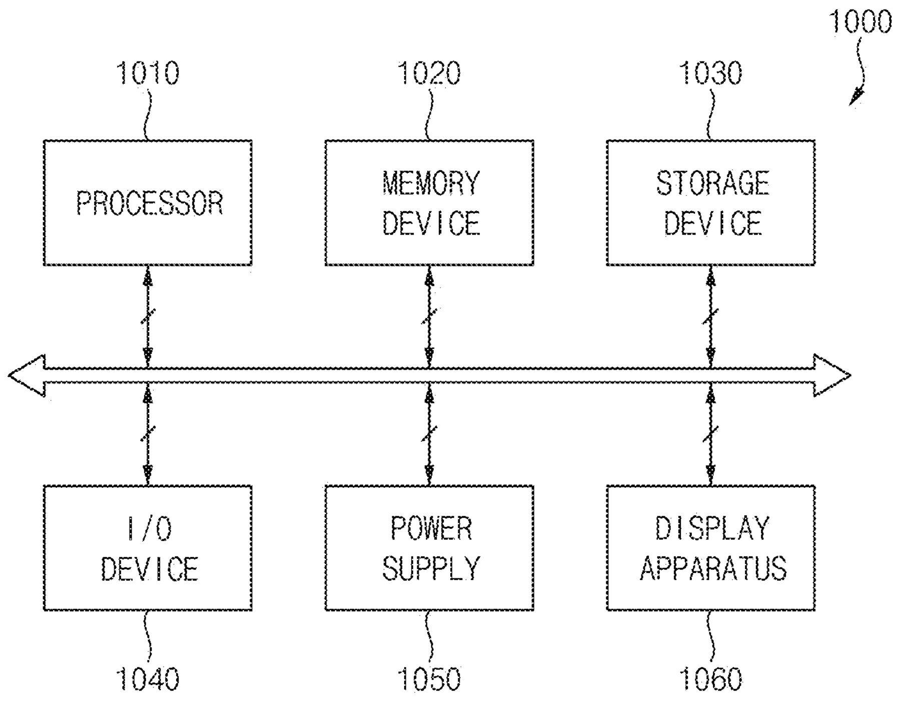
FIG. 16 is a block diagram illustrating an electronic device according to an embodiment.
Figure 17:
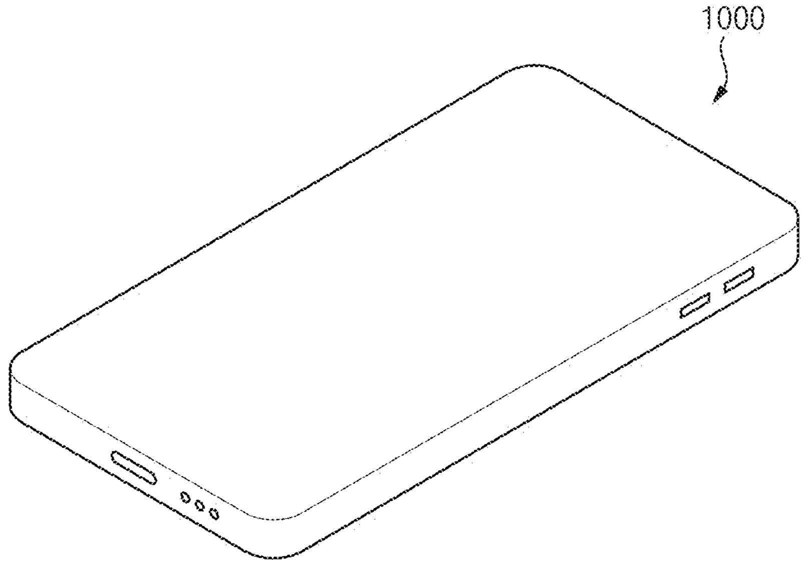
FIG. 17 is a view illustrating an example of the electronic device of FIG. 16 implemented as a smartphone.

FIG. 16 is a block diagram illustrating an electronic device according to an embodiment. FIG. 17 is a view illustrating an example of the electronic device of FIG. 16 implemented as a smartphone.

Referring to FIGS. 16 and 17, in an embodiment, an electronic device 1000 may include a processor 1010, a memory device 1020, a storage device 1030, an input/output ("I/O") device 1040, a power supply 1050, and a display device 1060. Here, the display device 1060 may correspond to the display device 10 of FIG. 1. The electronic device 1000 may further include a plurality of ports for communicating with a video card, a sound card, a memory card, a universal serial bus ("USB") device, or the like. In an embodiment, the electronic device 1000 may be implemented as a television. In another embodiment, the electronic device 1000 may be implemented as a smart phone. However, embodiments are not limited thereto, in another embodiment, the electronic device 1000 may be implemented as a cellular phone, a video phone, a smart pad, a smart watch, a tablet personal computer ("PC"), a car navigation system, a computer monitor, a laptop, a head disposed (e.g., mounted) display ("HMD"), or the like.

The processor 1010 may perform various computing functions. In an embodiment, the processor 1010 may be a microprocessor, a central processing unit ("CPU"), an application processor ("AP"), or the like. The processor 1010 may be coupled to other components via an address bus, a control bus, a data bus, or the like. In an embodiment, the processor 1010 may be coupled to an extended bus such as a peripheral component interconnection ("PCI") bus.

The memory device 1020 may store data for operations of the electronic device 1000. In an embodiment, the memory device 1020 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, or the like, and/or at least one volatile memory device such as a dynamic random access memory ("DRAM") device, a static random access memory ("SRAM") device, a mobile DRAM device, or the like.

In an embodiment, the storage device 1030 may include a solid state drive ("SSD") device, a hard disk drive ("HDD") device, a CD-ROM device, or the like. In an embodiment, the I/O device 1040 may include an input device such as a keyboard, a keypad, a mouse device, a touchpad, a touch-screen, or the like, and an output device such as a printer, a speaker, or the like.

The power supply 1050 may provide power for operations of the electronic device 1000. The power supply 1050 may provide power to the display device 1060. The display device 1060 may be coupled to other components via the buses or other communication links. In an embodiment, the display device 1060 may be included in the I/O device 1040.

In an embodiment the electronic device may be implemented as a smartphone. However the embodiments of the present disclosure may be exemplary and may not be limited to this. For example, the electronic device 1000 may be implemented as a mobile phone, a video phone, a smart pad, a smart watch, a television, a tablet PC, a vehicle display, a computer monitor, a notebook computer, a head-mounted display device, etc. In addition, the electronic device 1000 may be a television, a monitor, a notebook computer, or a tablet. In addition, the electronic device 1000 may be a car.

The display device according to the embodiments may be applied to a device included in a computer, a notebook, a mobile phone, a smartphone, a smart pad, a PMP, a PDA, an MP3 player, or the like.

Although the display device according to the embodiments have been described with reference to the drawings, the illustrated embodiments are examples, and may be modified and changed by a person having ordinary knowledge in the relevant technical field without departing from the technical spirit described in the following claims.

What is claimed is:

1. A display device comprising:

a substrate including a display area and a non-display area adjacent to the display area;

a plurality of data drivers disposed in the display area on the substrate and each including:

a first latch disposed adjacent to one side of the display area facing the non-display area;

a shift register spaced apart from the first latch in a first direction and which sequentially outputs an output signal; and a second latch spaced apart from the shift register in the first direction;

a plurality of pixels disposed in the display area on the substrate and disposed between adjacent elements of each of the plurality of the data drivers, wherein the adjacent elements include the first latch, the shift register, and the second latch;

a plurality of first data lines disposed in the non-display area on the substrate, adjacent to the first latch, connected to the data drivers, and to which a data signal in a digital form is applied; and a gamma driver overlapping at least a portion of the non-display area, and spaced apart from each of the data drivers and pixels in a second direction intersecting with the first direction, wherein the adjacent elements, in a same data driver and between which the plurality of pixels are disposed, are configured to communicate the data signal in the digital form to each other to generate a data voltage to be provided to the plurality of pixels, and wherein the gamma drivers include:

a gamma voltage generator overlapping the display area; and a gamma amplifier overlapping at least a portion of the non-display area, and adjacent to the gamma voltage generator.

2. The display device of claim 1, wherein the gamma voltage generator is spaced apart from each of the data drivers and the pixels in the second direction, and the gamma voltage generator and the gamma amplifier are spaced apart from each other in the second direction.

3. The display device of claim 1, wherein the display area includes:

first, second, third, and fourth display areas located at outermost edges of the display area, and spaced apart from each other; and a fifth display area located between the first, the second, the third, and the fourth display areas.

4. The display device of claim 3, wherein the pixels overlap the first, the second, the third, the fourth, and the fifth display areas, and the first latch, the second latch, and the shift register overlap the first, the second, the third, and the fourth display areas, not the fifth display area.

5. The display device of claim 3, wherein a gap between pixels adjacent in the first direction among the pixels located in the first, the second, the third, and the fourth display areas is relatively longer than a gap between pixels adjacent in the first direction among the pixels located in the fifth display areas.

6. The display device of claim 3, wherein the elements of the data drivers are disposed between the pixels, and further include a plurality of digital-analog converters and a demux circuit overlapping the first, second, third, and fourth display areas.

7. The display device of claim 6, wherein the demux circuit is disposed adjacent to the fifth display area.

8. The display device of claim 6, wherein the pixels are arranged in a second direction intersecting with the first direction, and the digital-analog converters are arranged alternately with the pixels in the first direction.

9. The display device of claim 6, wherein the data drivers further include a level shifter, and the level shifter is disposed between the second latch and a digital-analog converter adjacent to the second latch among the plurality of digital-analog converters.

10. The display device of claim 1, further comprising:

an encapsulation layer disposed on the pixels and the data drivers and overlapping the display area and the non-display area, and wherein the non-display area includes:

a first non-display area overlapping the encapsulation layer; and a second non-display area not overlapping the encapsulation layer.

11. The display device of claim 10, wherein the first data lines overlap the first non-display area.

12. The display device of claim 1, further comprising:

a plurality of second data lines electrically connected to the data drivers and the pixels, and to which the data voltage in an analog form is applied, and wherein the first data lines and the second data lines are spaced apart from each other.

13. A display device comprising:

a substrate including a display area and a non-display area adjacent to the display area, and including a silicon wafer;

a plurality of data drivers disposed in the display area on the substrate and each including:

a first latch disposed adjacent to one side of the display area facing the non-display area;

a shift register spaced apart from the first latch in a first direction and which sequentially outputs an output signal; and a second latch spaced apart from the shift register in the first direction;

a plurality of pixels disposed in the display area on the substrate and disposed between adjacent elements of each of the plurality of the data drivers, wherein the adjacent elements include the first latch, the shift register, and the second latch;

a plurality of first data lines disposed in the non-display area on the substrate, adjacent to the first latch, and to which a data signal in a digital form is applied;

a plurality of second data lines electrically connected to the data drivers and the pixels, and to which a data voltage in an analog form is applied; and a gamma driver overlapping at least a portion of the non-display area, and spaced apart from each of the data drivers and the pixels in a second direction intersecting with the first direction, wherein the adjacent elements, in a same data driver and between which the plurality of pixels are disposed, are configured to communicate the data signal in the digital form to each other to generate the data voltage in the analog form, and wherein the gamma drivers include:

a gamma voltage generator overlapping the display area; and a gamma amplifier overlapping at least a portion of the non-display area, and adjacent to the gamma voltage generator.

14. The display device of claim 13, wherein the elements of the data drivers are disposed between the pixels, and further include a plurality of digital-analog converters and a demux circuit overlapping the display area.

15. The display device of claim 14, further comprising:

an encapsulation layer disposed on the pixels and the data drivers and overlapping the display area and the non-display area, and wherein the non-display area includes:

a first non-display area overlapping the encapsulation layer; and a second non-display area not overlapping the encapsulation layer.

16. The method of claim 15, wherein the first data lines overlap the first non-display area.

17. An electronic device comprising:

a display device; and a power supply configured to provide power to the display device, wherein the display device comprises:

a substrate including a display area and a non-display area adjacent to the display area;

a plurality of data drivers disposed in the display area on the substrate and each including:

a first latch disposed adjacent to one side of the display area facing the non-display area;

a shift register spaced apart from the first latch in a first direction and which sequentially outputs an output signal; and a second latch spaced apart from the shift register in the first direction;

a plurality of pixels disposed in the display area on the substrate and disposed between adjacent elements of each of the plurality of the data drivers, wherein the adjacent elements include the first latch, the shift register, and the second latch; and a plurality of first data lines disposed in the non-display area on the substrate, adjacent to the first latch, connected to the data drivers, and to which a data signal in a digital form is applied; and a gamma driver overlapping at least a portion of the non-display area, and spaced apart from each of the data drivers and pixels in a second direction intersecting with the first direction, wherein the adjacent elements, in a same data driver and between which the plurality of pixels are disposed, are configured to communicate the data signal in the digital form to each other to generate a data voltage to be provided to the plurality of pixels, and wherein the gamma drivers include:

a gamma voltage generator overlapping the display area; and a gamma amplifier overlapping at least a portion of the non-display area, and adjacent to the gamma voltage generator.

* * * * *